US009020642B2

(12) United States Patent
Inazumi

(10) Patent No.: US 9,020,642 B2
(45) Date of Patent: Apr. 28, 2015

(54) ROBOT CONTROLLER, ROBOT SYSTEM, ROBOT CONTROL METHOD

(71) Applicant: Seiko Epson Corporation, Tokyo (JP)

(72) Inventor: Mitsuhiro Inazumi, Shiojiri (JP)

(73) Assignee: Seiko Epson Corporation (JP)

( * ) Notice: Subject to any disclaimer, the term of this patent is extended or adjusted under 35 U.S.C. 154(b) by 166 days.

(21) Appl. No.: 13/742,653

(22) Filed: Jan. 16, 2013

(65) Prior Publication Data
US 2013/0184868 A1 Jul. 18, 2013

(30) Foreign Application Priority Data
Jan. 17, 2012 (JP) .................................. 2012-006775

(51) Int. Cl.
*B25J 9/16* (2006.01)
*G05B 19/408* (2006.01)
*G06F 17/13* (2006.01)

(52) U.S. Cl.
CPC ........... *G05B 19/4086* (2013.01); *B25J 9/1633* (2013.01); *B25J 9/1648* (2013.01); *G05B 2219/39343* (2013.01); *G05B 2219/41124* (2013.01); *G05B 2219/42092* (2013.01);
(Continued)

(58) Field of Classification Search
CPC .................. B25J 9/1633; B25J 9/1648; G05B 2219/39319; G05B 2219/39342; G05B 2219/39343
USPC ................................................ 700/248, 260
See application file for complete search history.

(56) References Cited

U.S. PATENT DOCUMENTS

| 4,547,858 A | 10/1985 | Horak |
| 4,860,215 A * | 8/1989 | Seraji ............................ 700/260 |

(Continued)

FOREIGN PATENT DOCUMENTS

| EP | 1 930 131 A2 | 6/2008 |
| JP | 61-264414 | 11/1986 |

(Continued)

OTHER PUBLICATIONS

Baptista, L.F. et al., "Predictive force control of robot manipulators in nonrigid environments", from Industrial Robotics: Theory, Modeling and Control, Chapter 31, Dec. 2006, pp. 841-874.*

(Continued)

*Primary Examiner* — Behrang Badii
*Assistant Examiner* — David Testardi
(74) *Attorney, Agent, or Firm* — Harness, Dickey & Pierce, P.L.C.

(57) ABSTRACT

A robot controller includes a force control unit that outputs a correction value of a target track of a robot based on a detected sensor value acquired from a force sensor, a target value output unit that obtains a target value by performing correction processing on the target track based on the correction value and outputs the obtained target value, and a robot control unit that performs feedback control of the robot based on the target value. The force control unit includes an impedance processor that obtains a solution of a differential equation in force control as the correction value before the conversion processing, and a nonlinear convertor that obtains the correction value after the conversion processing by performing nonlinear conversion processing on the correction value before the conversion processing acquired from the impedance processor and outputs the obtained correction value after the conversion processing.

19 Claims, 22 Drawing Sheets

(52) U.S. Cl.
CPC ...... *G05B2219/42267* (2013.01); *G06F 17/13* (2013.01); *Y10S 901/02* (2013.01)

(56) References Cited

U.S. PATENT DOCUMENTS

| | | | |
|---|---|---|---|
| 5,023,808 A * | 6/1991 | Seraji | 700/248 |
| 5,129,044 A * | 7/1992 | Kashiwagi et al. | 700/251 |
| 5,206,930 A * | 4/1993 | Ishikawa et al. | 700/260 |
| 5,497,061 A * | 3/1996 | Nonaka et al. | 318/568.11 |
| 6,505,096 B2 | 1/2003 | Takenaka et al. | |
| 7,112,938 B2 | 9/2006 | Takenaka et al. | |
| 7,508,155 B2 * | 3/2009 | Sato et al. | 318/646 |
| 7,558,647 B2 * | 7/2009 | Okazaki | 700/260 |
| 8,204,626 B2 | 6/2012 | Yoshiike et al. | |
| 8,306,657 B2 | 11/2012 | Yoshiike et al. | |
| 8,311,677 B2 | 11/2012 | Yoshiike et al. | |
| 8,442,680 B2 | 5/2013 | Orita | |
| 2003/0009259 A1 | 1/2003 | Hattori et al. | |
| 2008/0140257 A1 * | 6/2008 | Sato et al. | 700/258 |
| 2010/0234999 A1 | 9/2010 | Nakajima | |
| 2011/0098856 A1 | 4/2011 | Yoshiike et al. | |
| 2011/0098860 A1 | 4/2011 | Yoshiike et al. | |
| 2011/0166709 A1 | 7/2011 | Kim et al. | |
| 2011/0213495 A1 | 9/2011 | Orita | |
| 2011/0213496 A1 | 9/2011 | Orita | |
| 2012/0072026 A1 | 3/2012 | Takagi | |
| 2013/0184868 A1 | 7/2013 | Inazumi | |

FOREIGN PATENT DOCUMENTS

| | | | |
|---|---|---|---|
| JP | 64-044510 | 2/1989 | |
| JP | 04-306712 | 10/1992 | |
| JP | 05-108108 | 4/1993 | |
| JP | 06-170763 | 6/1994 | |
| JP | 06-246673 | 9/1994 | |
| JP | 07024665 A * | 1/1995 | B23P 19/02 |
| JP | 07210250 A * | 8/1995 | G05D 3/12 |
| JP | 08243958 A * | 9/1996 | B25J 9/10 |
| JP | 09185416 A * | 7/1997 | G05D 3/12 |
| JP | 10-128685 | 5/1998 | |
| JP | 10151590 A * | 6/1998 | B25J 13/00 |
| JP | 10-230485 | 9/1998 | |
| JP | 2000218577 A * | 8/2000 | B25J 9/12 |
| JP | 3412324 B | 3/2003 | |
| JP | 2004-058191 | 2/2004 | |
| JP | 2005-334999 | 12/2005 | |
| JP | 2011-008360 | 1/2011 | |

OTHER PUBLICATIONS

Champagne, Benoit et al., "Discrete time signal processing: Class Notes for the Course ECSE—412", Chapter 9 (Filter design), pp. 166-199, downloaded from: http://ens.ewi.tudelft.nl/Education/courses/et2405/notes/champagne04.pdf.*

Morales, B. et al., "Robot control with inverse dynamics and non-linear gains", Latin American applied research, 2009, 5 pages.*

Seraji, Homayoun, "A new class of nonlinear PID controllers with robotic applications", Journal of Robotic Systems 15(3), 1998, pp. 161-181.*

Seraji, Homayoun, "Nonlinear and adaptive control of force and compliance in manipulators", The International Journal of Robotics Research, 17(5), May 1998, pp. 467-484.*

Seraji, Homayoun et al., "Nonlinear contact control for space station dexterous arms", Proceedings of the 1998 IEEE International Conference on Robotics & Automation, May 1998, pp. 899-906.*

Champagne, Benoit et al., "Discrete time signal processing: Class Notes for the Course ECSE—412", Chapter 9 (Filter design), Winter 2004, pp. 166-199, downloaded from: http://ens.ewi.tudelft.nl/Education/courses/et2405/notes/champagne04.pdf.*

Extended European Search Report for Application No. EP 13 15 1284 mailed Jun. 6, 2013 (11 pages).

Extended European Search Report for Application No. EP 13 15 1288 mailed Jun. 6, 2013 (8 pages).

Seraji, Homayoun, "Nonlinear and Adaptive Control of Force and Compliance in Manipulators", International Journal of Robotics Research, Sage Science Press, Thousand Oaks, US, vol. 17, No. 5, May 1, 1998, pp. 467-484, XP000754908.

Seraji, Homayoun et al., "Nonlinear Contact Control for Space Station Dexterous Arms", Robotics and Automation, 1998, Proceedings, IEEE International Conference on Leuven, Belgium, May 16-20, 1998, New York, NY, US, IEEE, vol. 1, pp. 899-906, SP010281097.

* cited by examiner

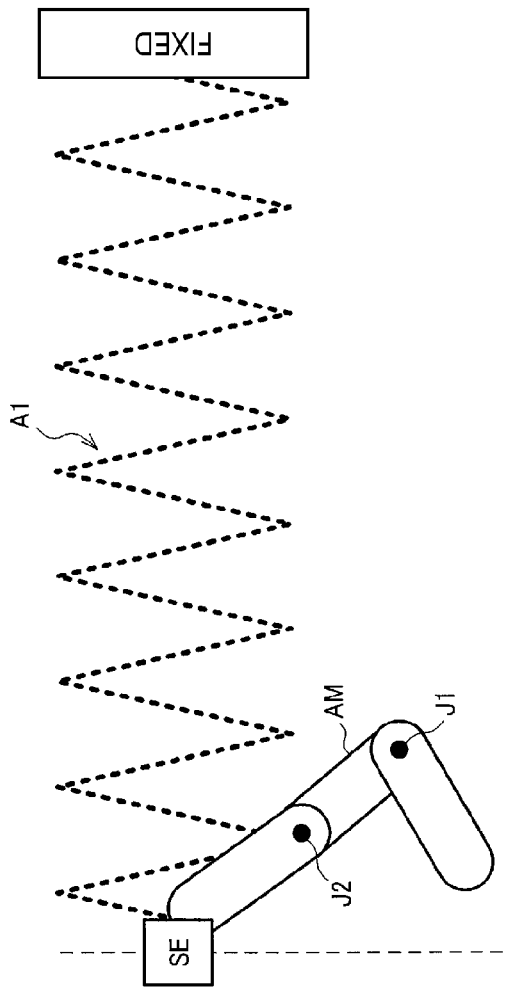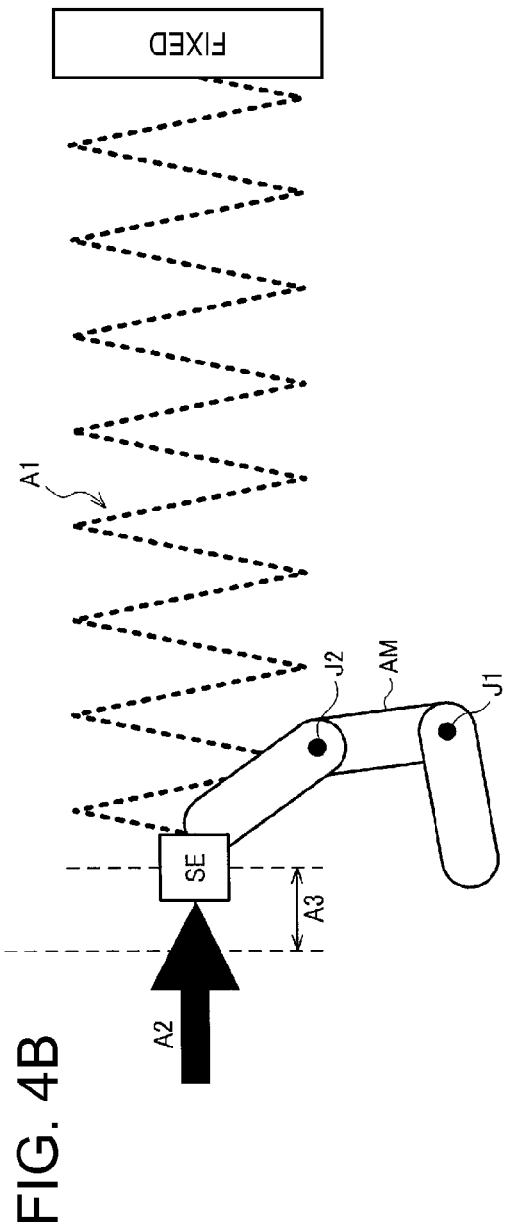

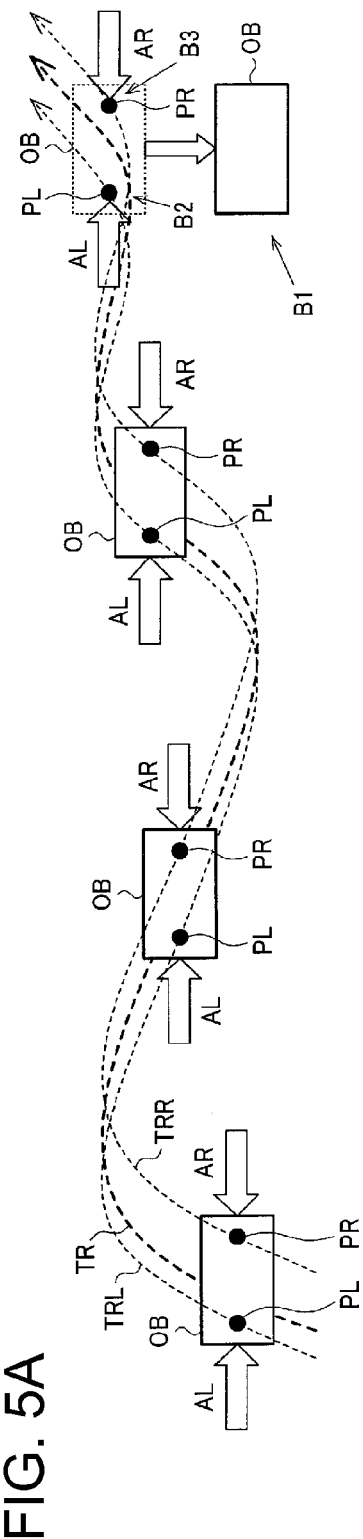
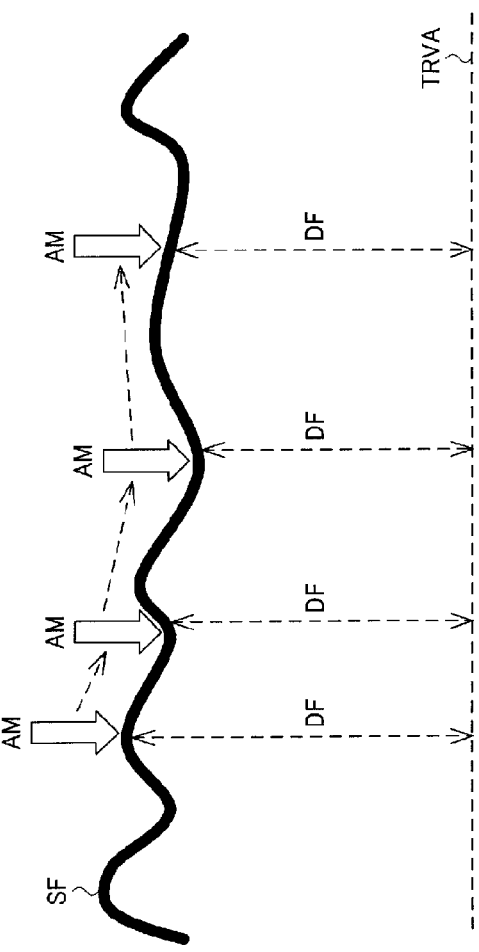
FIG. 5A
FIG. 5B

ROBOT CONTROLLER, ROBOT SYSTEM, ROBOT CONTROL METHOD

BACKGROUND

1. Technical Field

The present invention relates to a robot controller, a robot system, and a robot control method.

2. Related Art

Operations using robots such as manipulators include operations with various constraints, for example, in contact with objects. In these cases, force control is often required in addition to location control. For example, in the cases of tracing the surface of an object, fitting one object in another object, and grasping a soft object so as not to break it, movement in response to the reaction force from the object is necessary in addition to simple location control.

Representative methods of force control in robots include a method called impedance control. Impedance control is a control method of moving a robot, regardless of its real mass, viscosity property, and elasticity property, as if it had those values suitable for an operation. This is a control method of solving an equation of motion based on force information obtained from a force sensor attached to the robot and moving the robot according to the solution. By appropriately setting the equation of motion, a robot such as a manipulator can be moved as if it had predetermined mass, viscosity, and elasticity.

Note that, in the impedance control, in order to allow the robot or the like to behave as if it had desired properties (mass, viscosity property, elasticity property), it is necessary to solve a differential equation using coefficient parameters corresponding to the properties (an equation of motion as a second-order linear differential equation). Various methods of solving the differential equation are known, and the Runge-Kutta method, the Newton method, or the like is typically used.

As a related art with respect to impedance control and force control, a technology disclosed in JP-A-10-128685 or JP-A-2011-8360 is known.

In the impedance control, for example, force is specified as expansion and contraction of a virtual spring (virtual displacement).

However, in the case where large force is necessary, if large virtual displacement is specified, when external force for the force disappears, the manipulator produces very large movement corresponding to the specified virtual displacement. Such large movement is very problematic in practice and safety.

Further, by specifying large virtual displacement, large force (external force) can be produced in principle, however, there is a problem that a workpiece as an object of operation of the robot may be broken by the produced force.

These are the problems caused by impedance control for linear output with respect to virtual displacement. JP-A-10-128685 and JP-A-2011-8360 disclose methods of performing impedance control for linear output with respect to virtual displacement.

First, JP-A-10-128685 discloses a method of performing nonlinear impedance control by using a function that is non-linear with respect to virtual displacement as the elasticity term of an equation of motion in force control.

However, in this technology, there is a problem that it is very difficult to determine whether or not the equation of motion used for force control is stable.

JP-A-2011-8360 discloses a method of providing two (plural) control mechanisms and two control parameters and assuming a hyperplane called a sliding surface in a control state space, switching the two (plural) control mechanisms and the two control parameters depending on which of the spaces divided by the hyperplane contains the control state, and thereby, constraining the control state on the sliding surface and ensuring stability and convergence of the control system.

However, in this technology, it is difficult to design the sliding mode control system, and the technology is not suitable for practical use.

SUMMARY

An advantage of some aspects of the invention is to provide a robot controller, a robot system, and a robot control method that perform nonlinear impedance control and facilitate verification of stability of the solution of the equation of motion and realization as hardware.

An aspect of the invention relates to a robot controller including a force control unit that outputs a correction value of a target track of a robot based on a detected sensor value acquired from a force sensor, a target value output unit that obtains a target value by performing correction processing on the target track based on the correction value and outputs the obtained target value, and a robot control unit that performs feedback control of the robot based on the target value, wherein the force control unit includes an impedance processor that obtains a solution of a differential equation in force control as the correction value before conversion processing, and a nonlinear convertor that obtains the correction value after the conversion processing by performing nonlinear conversion processing on the correction value before the conversion processing acquired from the impedance processor and outputs the obtained correction value after the conversion processing.

In the aspect of the invention, by performing filter processing on the output value of the linear impedance processing, nonlinear impedance control may be realized. Further, by using the combination of linear systems, the stability of the solution of the equation of motion can be verified.

Another aspect of the invention relates to a robot controller including a force control unit that outputs a correction value of a target track of a robot based on a detected sensor value acquired from a force sensor, a target value output unit that obtains a target value by performing correction processing on the target track based on the correction value and outputs the obtained target value, and a robot control unit that performs feedback control of the robot based on the target value, wherein the force control unit includes a nonlinear convertor that performs nonlinear conversion processing on the detected sensor value acquired from the force sensor and obtains the detected sensor value after conversion processing, and an impedance processor that obtains a solution of a differential equation in force control as the correction value based on the detected sensor value after the conversion processing acquired from the nonlinear convertor.

In this aspect of the invention, by performing filter processing on the input value of the linear impedance processing, nonlinear impedance control may be realized. Further, by using the combination of linear systems, the stability of the solution of the equation of motion can be verified.

In one aspect of the invention, in the case where an amount of a displacement change with respect to an external force when virtual displacement with respect to the robot corresponding to the correction value is a first displacement and is a first amount of displacement change, and the amount of displacement change when the virtual displacement is a second displacement and is a second amount of displacement change, the force control unit may perform the nonlinear conversion processing so that the first amount of displacement change may be larger than the second amount of displacement change when the virtual displacement is the first displacement and larger than the second displacement, and output the correction value.

Thereby, for example, force control can be performed wherein, as the absolute value of the virtual displacement becomes larger, the amount of displacement change or the like also becomes larger.

In one aspect of the invention, in the case where an amount of a displacement change with respect to an external force when virtual displacement with respect to the robot corresponding to the correction value is first displacement and is a first amount of displacement change, and an amount of displacement change when the virtual displacement is a second displacement and is a second amount of displacement change, the force control unit may perform the nonlinear conversion processing so that the first amount of displacement change may be smaller than the second amount of displacement change when the virtual displacement is the first displacement and larger than the second displacement, and output the correction value.

Thereby, for example, force control can be performed wherein, as the absolute value of the virtual displacement becomes larger, the amount of displacement change or the like becomes smaller.

In one aspect of the invention, the force control unit may perform first force control when a direction of the virtual displacement with respect to the robot corresponding to the correction value is a first direction, and perform second force control different from the first force control when the direction of the virtual displacement is a second direction opposite to the first direction.

Thereby, switching of the force control to be executed or the like can be performed based on the virtual displacement direction.

In one aspect of the invention, the nonlinear convertor may perform the nonlinear conversion processing using a sigmoid function on the correction value before the conversion processing acquired from the impedance processor or the detected sensor value acquired from the force sensor.

Thereby, the nonlinear conversion processing using the sigmoid function or the like can be performed.

In one aspect of the invention, the impedance processor may have a digital filter that obtains the solution of the differential equation in force control as the correction value.

Thereby, processing in force control of obtaining the solution of the differential equation can be performed using the digital filter, and facilitation of realization as hardware or the like can be performed.

In one aspect of the invention, the force control unit may determine the stability of an operation of the digital filter of obtaining the correction value, and obtain the solution of the differential equation in force control as the correction value if a determination is made that the operation of the digital filter part is stable.

Thereby, a determination of the stability of the digital filter or the like can be performed.

In one aspect of the invention, the differential equation may be an equation of motion having a virtual mass term, a virtual viscosity term, and a virtual elasticity term as coefficient parameters.

Thereby, obtainment of the solution of the equation of motion or the like can be performed.

Still another aspect of the invention relates to a robot system including the robot controller, and the robot that moves the respective parts based on the target value acquired from the target value output unit.

Thereby, not only the robot controller but also realization of the robot system executing the processing of the embodiment or the like can be obtained.

Yet another aspect of the invention relates to a robot control method including obtaining a solution of a differential equation in force control as a correction value before conversion processing used for correction processing of a target track of a robot based on a detected sensor value acquired from a force sensor, obtaining the correction value after the conversion processing by performing nonlinear conversion processing on the obtained correction value before conversion processing, performing the correction processing on the target track of the robot to obtain a target value based on the obtained correction value after the conversion processing, and performing feedback control of the robot based on the obtained target value.

Still yet another aspect of the invention relates to a robot control method including performing nonlinear conversion processing on a detected sensor value acquired from a force sensor, and thereby, obtaining the detected sensor value after conversion processing used for correction processing of a target track of a robot, obtaining a solution of a differential equation in force control as a correction value based on the obtained detected sensor value after the conversion processing, obtaining a target value by performing the correction processing on the target track of the robot based on the obtained correction value, and performing feedback control of the robot based on the obtained target value.

Further, another aspect of the invention relates to a robot control method of performing control of a robot having a force sensor, including performing force control by which a relationship between a magnitude of an external force applied to the force sensor and a magnitude of displacement of the robot when the external force is applied is nonlinear.

BRIEF DESCRIPTION OF THE DRAWINGS

The invention will be described with reference to the accompanying drawings, wherein like numbers reference like elements.

FIGS. 4A and 4B are explanatory diagrams of compliance control.

FIGS. 5A and 5B are explanatory diagrams of impedance control.

DESCRIPTION OF EXEMPLARY EMBODIMENTS

Below, embodiments will be explained. First, the outline of the embodiments will be explained. Then, the first embodiment and the second embodiment will be respectively explained including system configuration examples and detailed processing. Note that the embodiments to be explained do not unduly limit the invention described in the appended claims. Further, all of the configurations to be explained in the embodiments are not necessarily essential structural elements of the invention.

1. Outline 1.1 Basic Configuration

Figure 1:
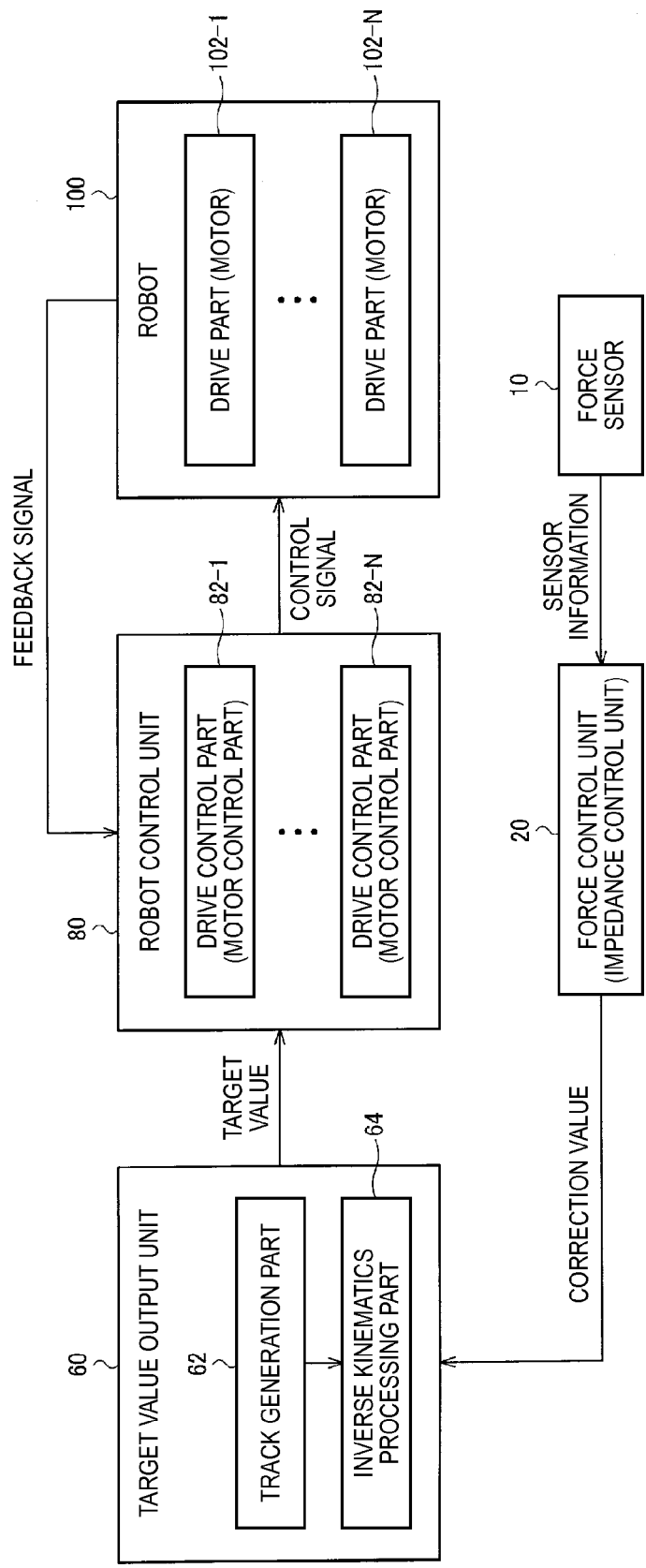
FIG. 1 shows a basic configuration example of a robot controller and a robot system.

FIG. 1 shows a configuration example of a robot controller (manipulator controller) and a robot system including the controller of the embodiment. Note that the robot controller and the robot system of the embodiment are not limited to those having the configuration in FIG. 1, and various modifications can be made by omitting part of their component elements and adding other component elements.

The robot controller of the embodiment includes a force control unit 20, a target value output unit 60, and a robot control unit 80. Further, the robot system of the embodiment includes the robot controller and a robot 100 (force sensor 10).

The target value output unit 60 outputs a target value of feedback control of the robot (manipulator in a narrow sense). The feedback control of the robot 100 is realized based on the target value. In a multi-joint robot as an example, the target value is joint angle information of the robot or the like. The joint angle information of the robot is information representing angles of the respective joints (angles formed by joint axes and joint axes) in a link mechanism of the arms of the robot, for example.

The target value output unit 60 may include a track generation part 62 and an inverse kinematics processor 64. The track generation part 62 outputs track information of the robot. The track information may include location information (x, y, z) of an end effector part (end point) of the robot and rotation angle information (u, v, w) around the respective coordinate axes. The inverse kinematics processor 64 performs inverse kinematics processing based on the track information from the track generation part 62, and outputs the joint angle information of the robot as the target value, for example. The inverse kinematics processing is processing of calculating the movement of the robot having joints and processing of calculating the joint angle information or the like from the location and position of the end effector of the robot using inverse kinematics.

The force control unit 20 (impedance control unit in a narrow sense) performs force control (force sense control) based on the sensor information from the force sensor 10 and outputs a correction value of the target value. Further, specifically, the force control unit 20 (impedance control unit) performs impedance control (or compliance control) based on sensor information (force information, moment information) from the force sensor 10. The force control is control with the addition of force feedback to location control in the related art. Impedance control is a method of turning the ease of displacement (mechanical impedance) of the end effector part (hand) for external force into a desired condition by control. Specifically, the control is, in a model in which a mass, a viscosity coefficient, and an elastic element are connected to the end effector part of the robot, to bring the part into contact with an object with the mass, viscosity coefficient, and the elastic coefficient set as targets. Further, the force sensor 10 is a sensor that detects force as a reaction force of the force by the robot 100 and moment. The force sensor 10 is typically attached to the wrist part of the arm of the robot 100, and the detected force and moment is used for various force control (impedance control) as sensor information.

The robot control unit 80 performs feedback control of the robot based on the target value obtained from the target value output unit 60. Specifically, the unit performs the feedback control of the robot based on the target value output as a result of correction processing based on the correction value from the force control unit 20. For example, the unit performs the feedback control of the robot 100 based on the target value and a feedback signal from the robot 100. For example, the robot control unit 80 includes plural drive control parts 82-1 to 82-N (motor control parts in a narrow sense), and outputs their control signals to drive parts 102-1 to 102-N of the robot 100. Here, the drive parts 102-1 to 102-N are drive mechanisms for moving the respective joints of the robot 100 and realized by motors or the like, for example.

Figure 2A:
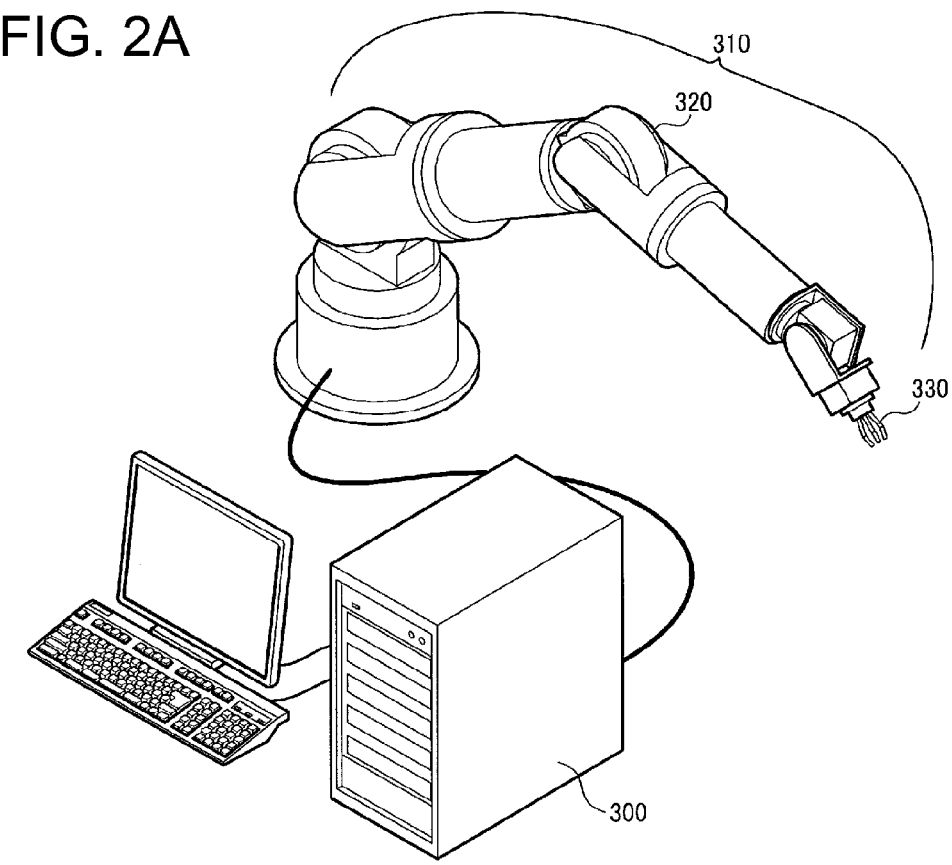
FIGS. 2A and 2B show examples of the robot systems.

FIG. 2A shows an example of the robot system including the robot controller of the embodiment. The robot system includes a control device 300 (information processing unit) and a robot 310 (robot 100 in FIG. 1). The control device 300 performs control processing of the robot 310. Specifically, the device performs control of moving the robot 310 based on movement sequence information (scenario information). The robot 310 has an arm 320 and a hand (grasping part) 330, and moves according to the movement command from the control device 300. For example, the robot performs movement of grasping and moving work placed on a pallet (not shown). Further, information of the position of the robot and the location of the work is detected based on image information acquired by an imaging device (not shown), and the detected information is sent to the control device 300.

The robot controller of the embodiment is provided in the control device 300 in FIG. 2A, for example, and the robot controller is realized by hardware and programs of the control device 300. Further, according to the robot controller of the embodiment, a performance requirement for the control hardware of the control device 300 or the like may be reduced and the robot 310 may be moved with high responsiveness.

Figure 2B:
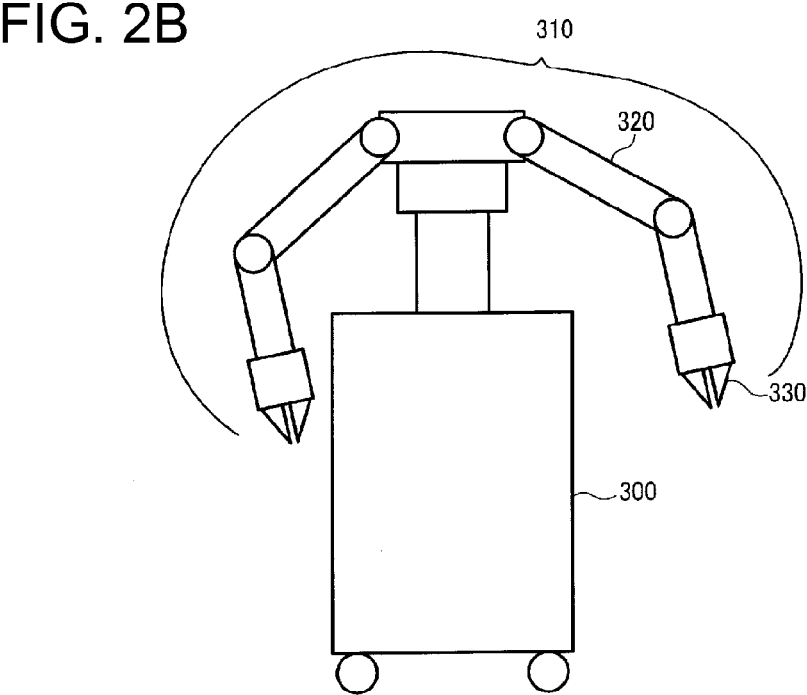

Further, the robot main body 310 (robot) and the control device 300 (robot controller) are separately formed in FIG. 2A, however, the robot of the embodiment is not limited to one having the configuration in FIG. 2A, and the robot main body 310 and the control device 300 may be integrally formed as shown in FIG. 2B. Specifically, as shown in FIG. 2B, the robot includes the robot main body 310 (having the arm 320 and the hand 330) and a base unit part that supports the robot main body 310, and the control device 300 is housed in the base unit part. In the robot in FIG. 2B, wheels or the like are provided in the base unit part so that the entire robot may be shifted (moved). Note that, though FIG. 2A shows an example of a single-arm type, the robot may be a multi-arm robot such as a dual-arm type as shown in FIG. 2B. Note that the robot may be manually shifted or motors for driving the wheels may be provided and the motors may be controlled by the control device 300 for shifting.

1.2 Force Control and Impedance Control

Next, the outline of the force control and the impedance control (compliance control) will be explained.

Figure 3A:
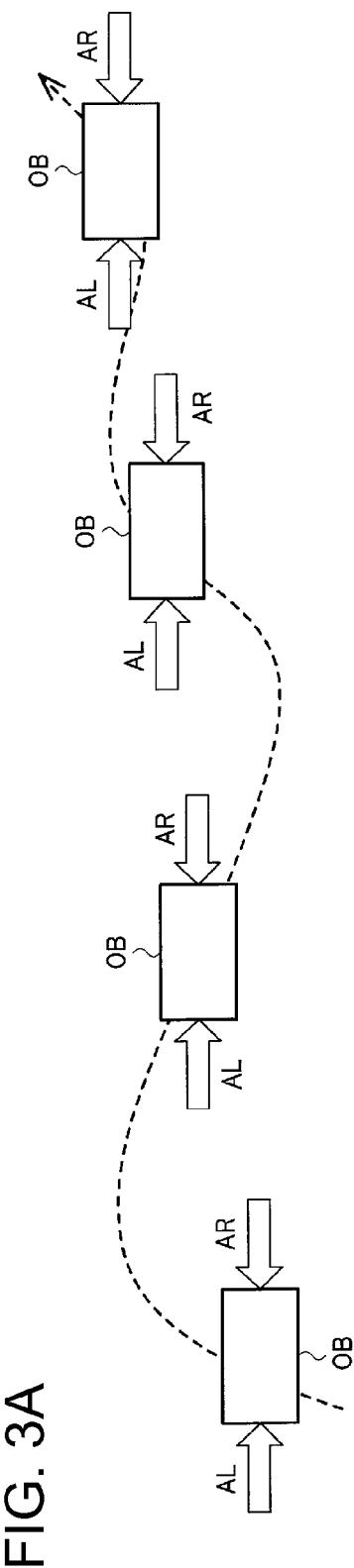
FIGS. 3A to 3C are explanatory diagrams of force control.

FIG. 3A shows a shift of the robot gripping an object OB with a left arm AL and a right arm AR. For example, only by the location control, the object may be dropped or broken. According to the force control, soft objects and fragile objects can be gripped with appropriate force from both sides and shifted as shown in FIG. 3A.

Figure 3C:
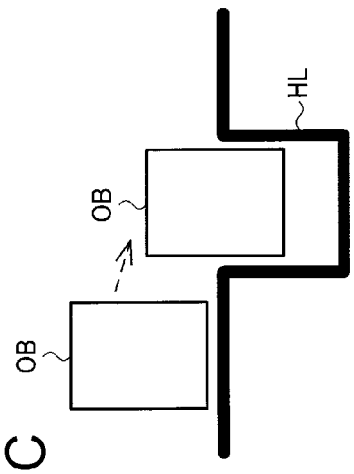
Figure 3B:
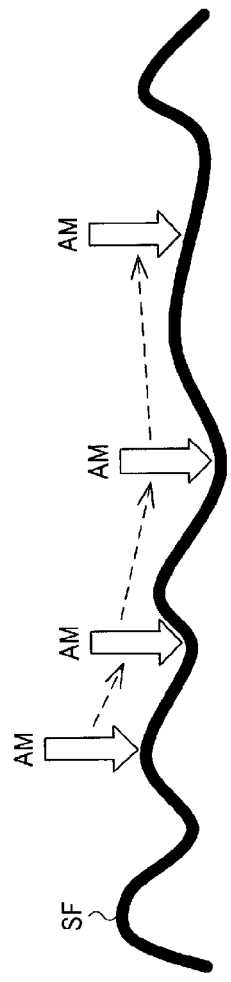

Further, according to the force control, as shown in FIG. 3B, a surface SF of an object with uncertainty may be traced by an arm AM or the like. It is impossible to realize this control by only location control. Furthermore, according to the force control, as shown in FIG. 3C, after rough positioning, the object OB may be aligned by searching and fitted into a hole HL.

However, the limited usage is problematic according to the force control using a real mechanical part such as a spring. In the force control using a mechanical part, dynamic switching between characteristics is difficult.

On the other hand, torque control of controlling torque of a motor is easy, however, deterioration in location accuracy is problematic. Further, a problem of collision occurs in an emergency. For example, in FIG. 3A, when an emergency occurs and the object OB is dropped, in the torque control, the reaction forces to be balanced disappear and a problem occurs in that the left and right arms AL, AR collide with each other or the like.

In contrast, impedance control (compliance control) is complex control, but has an advantage of higher versatility and safety.

FIGS. 4A and 4B are diagrams for explanation of the compliance control as one type of impedance control. Compliance refers to an inverse of a spring constant, and the spring constant indicates hardness and the compliance indicates softness. The control for providing the compliance as mechanical flexibility when an interaction acts between the robot and the environment is referred to as compliance control.

For example, in FIG. 4A, a force sensor SE is attached to an arm AM of the robot. The arm AM of the robot is programmed so that its position may be changed in response to sensor information (force and torque information) obtained by the force sensor SE. Specifically, the robot is controlled as if a virtual spring shown by A1 in FIG. 4A was attached to the tip end of the arm AM.

For example, the spring constant of the spring shown by A1 is 100 Kg/m. When the spring is pressed with force of 5 Kg as shown by A2 in FIG. 4B, the spring contracts by 5 cm as shown by A3. To put it another way, when the spring contracts by 5 cm, the spring is pressed with force of 5 Kg. That is, the force information and the location information are linearly associated.

In the compliance control, control as if the virtual spring shown by A1 was attached to the tip end of the arm AM is performed. Specifically, the robot is controlled to move in response to the input of the force sensor SE and retract by 5 cm as shown by A3 for the weight of 5 Kg shown by A2, and controlled so that the location information may be changed in response to the force information.

Simple compliance control does not include a time term, however, control including a time term and considering the terms to the second-order is included in the impedance control. Specifically, the second-order term is the mass term and the first-order term is the viscosity term, and the model of the impedance control may be expressed by an equation of motion as shown in the following equation (1).

$$f(t) = m\ddot{x} + \mu\dot{x} + kx \tag{1}$$

In the equation (1), m is a mass, $\mu$ is a coefficient of viscosity, k is an elastic modulus, f is force, x is displacement from a target location. Further, the first derivation and the second derivation of x correspond to velocity and acceleration, respectively. In the impedance control, a control system for providing the property of the equation (1) to the end effector part as the tip end of the arm is configured. That is, the control is performed as if the tip end of the arm had a virtual mass, a virtual coefficient of viscosity, and a virtual elastic modulus.

As described above, the impedance control is control, in a model in which the viscosity element and the elastic element are connected to the mass of the tip end of the arm in the respective directions, of bringing the arm in contact with an object with a targeted coefficient of viscosity and elastic modulus.

For example, as shown in FIG. 5A, control of gripping the object OB with the arms AL, AR of the robot and moving it along a track TR is considered. In this case, a track TRL is a track in which a point PL set inside of the left side of the object OB passes, and a virtual left-hand track determined in the assumption of the impedance control. Further, a track TRR is a track in which a point PR set inside of the right side of the object OB passes, and a virtual right-hand track determined in the assumption of the impedance control. In this case, the arm AL is controlled so that force in response to the distance difference between the tip end of the arm AL and the point PL occurs. Further, the arm AR is controlled so that force in response to the distance difference between the tip end of the arm AR and the point PR occurs. In this manner, the impedance control of shifting the object OB while gripping it softly may be realized. Further, in the impedance control, even when the object OB is dropped as shown by B1 in FIG. 5A, the arms AL, AR are controlled so that their tip ends may be stopped in the locations of the points PL, PR as shown by B2, B3. That is, unless the virtual track is a collision track, the arms AL, AR may be prevented from colliding with each other.

Further, as shown in FIG. 5B, also, in the case of the control of tracing the surface SF of the object, in the impedance control, control is performed so that force in response to a distance difference DF between a virtual track TRVA and the tip end may act on the tip end of the arm AM. Therefore, the control of tracing the surface SF while applying force to the arm AM can be performed.

These examples show linear impedance control. Note that, for example, in the example of FIG. 5A, when it is impossible to grasp the object OB unless stronger force is applied thereto, it is desirable to set PL at the further right-hand AR side and PR at the further left-hand AL side. In this case, if the object OB is dropped, the right hand AR of the robot may move to the point PR and the left hand AL may move to the point PL according to the settings, and the hands may collide with each other. As described above, in the linear impedance control, a linear solution (force, external force) is determined with respect to the virtual displacement, and it is impossible to make the force applied to the object OB stronger with the points PL and PR set in the locations in FIG. 5A.

Figure 6A:
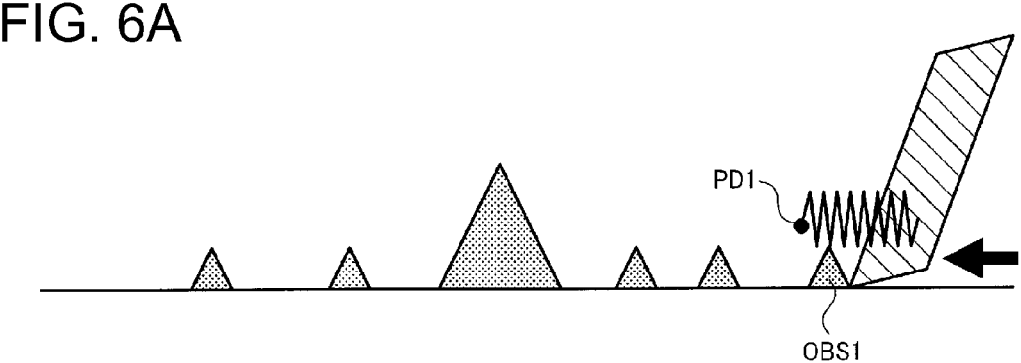
FIGS. 6A to 6C are explanatory diagrams of problems of linear impedance control.
Figure 6B:
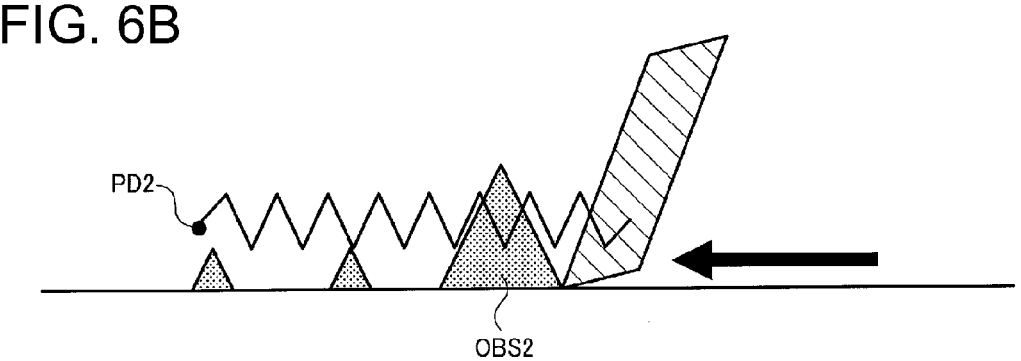
Figure 6C:
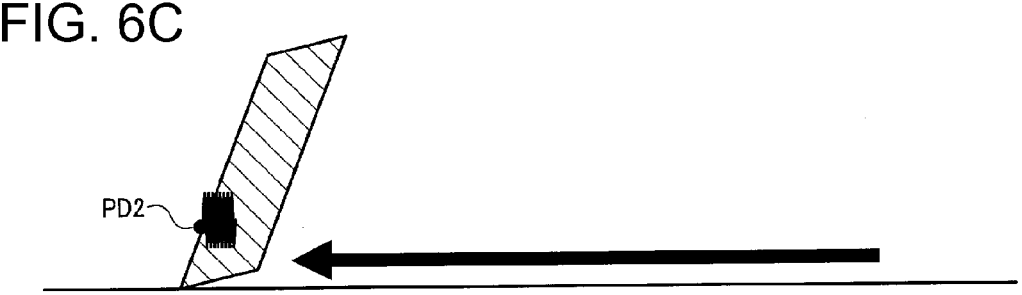

Similarly, FIGS. 6A to 6C show an example when the finger tip of the robot moves along a surface of an object with irregularities or moves while scraping the irregularities of the surface.

In the case where little force is necessary when a protrusion OBS1 is scraped in FIG. 6A, force necessary for scraping the protrusion OBS1 may be produced with small virtual displacement such that the target location of the finger tip of the robot is PD1.

However, in the case where large force is necessary when a protrusion OBS2 is scraped in FIG. 6B only using the same impedance control parameters as those in FIG. 6A, it is desirable to produce large virtual displacement such that the target location of the finger tip of the robot is PD2.

In this regard, if the reaction force disappears as shown in FIG. 6C, the manipulator of the robot produces large movement. This may be caused even in human operation, and actually, a human changes the force level by force provided to the object and the virtual displacement.

Accordingly, in the embodiments to be described later, a method of avoiding collision in FIG. 5A and large movement in FIG. 6C by outputting the nonlinear solution (force) with respect to the virtual displacement is used.

1.3 Configuration of Control System

Figure 7:
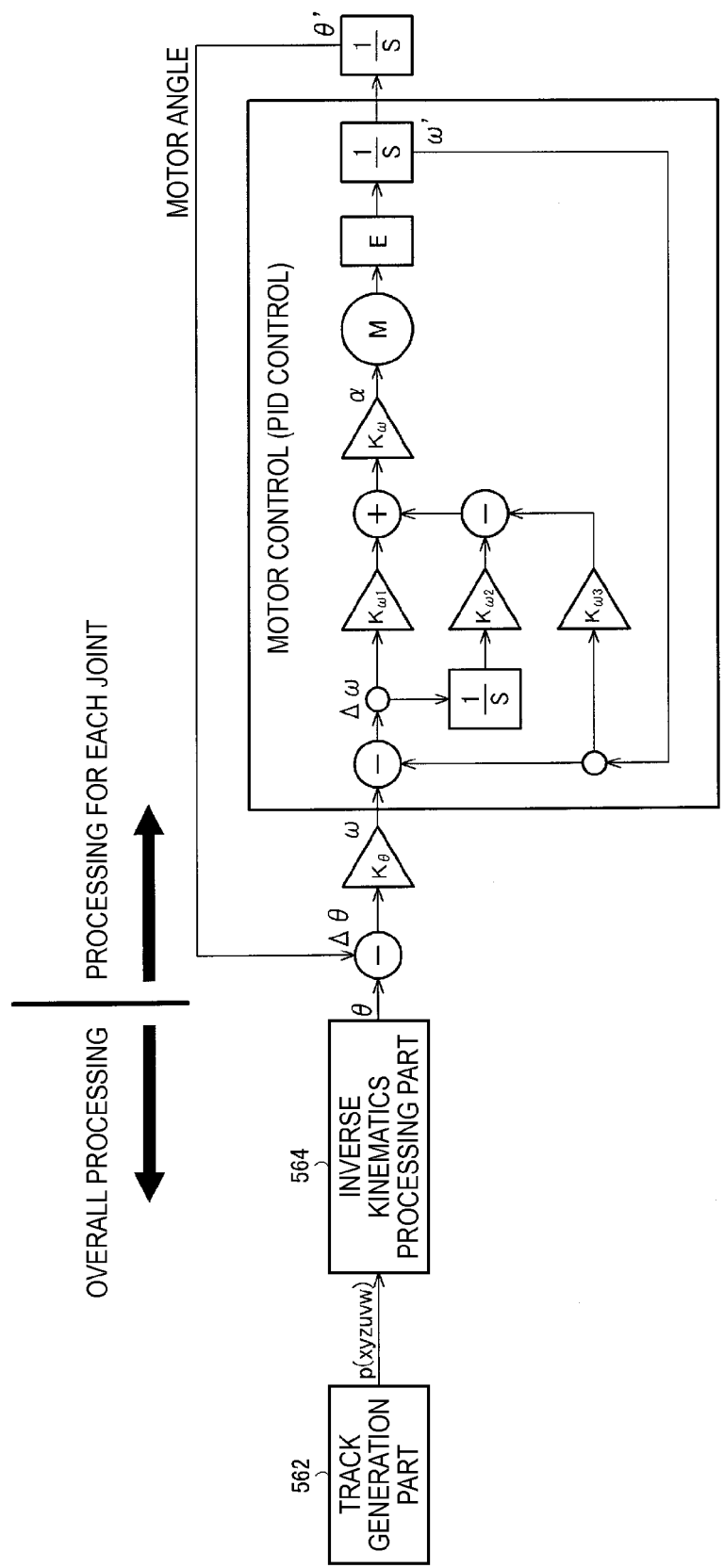
FIG. 7 shows a basic configuration example of a control system that does not include force sense feedback.

Here, FIG. 7 shows a basic configuration example of a control system not including force sense feedback.

A track generation part 562 generates track information p (xyzuvw) and outputs it to an inverse kinematics processor 564. Here, the track information p includes location information (xyz) of the tip end of the arm (end effector part) and rotation information (uvw) around the respective axes, for example. Further, the inverse kinematics processor 564 performs inverse kinematics processing based on the track information p, and generates and outputs a joint angle θ of each joint as a target value. Then, motor control is performed based on the joint angle θ, and thereby, movement control of the arm of the robot is performed. In this case, the control of the motor (M) in FIG. 7 is realized by PID control. Since PID control is a known technology, its detailed explanation is omitted here.

In FIG. 7, the track generation part 562 and the inverse kinematics processor 564 form a target value output unit. The processing of the target value output unit is overall processing of the robot. On the other hand, the downstream motor control is control with respect to each joint.

Figure 8:
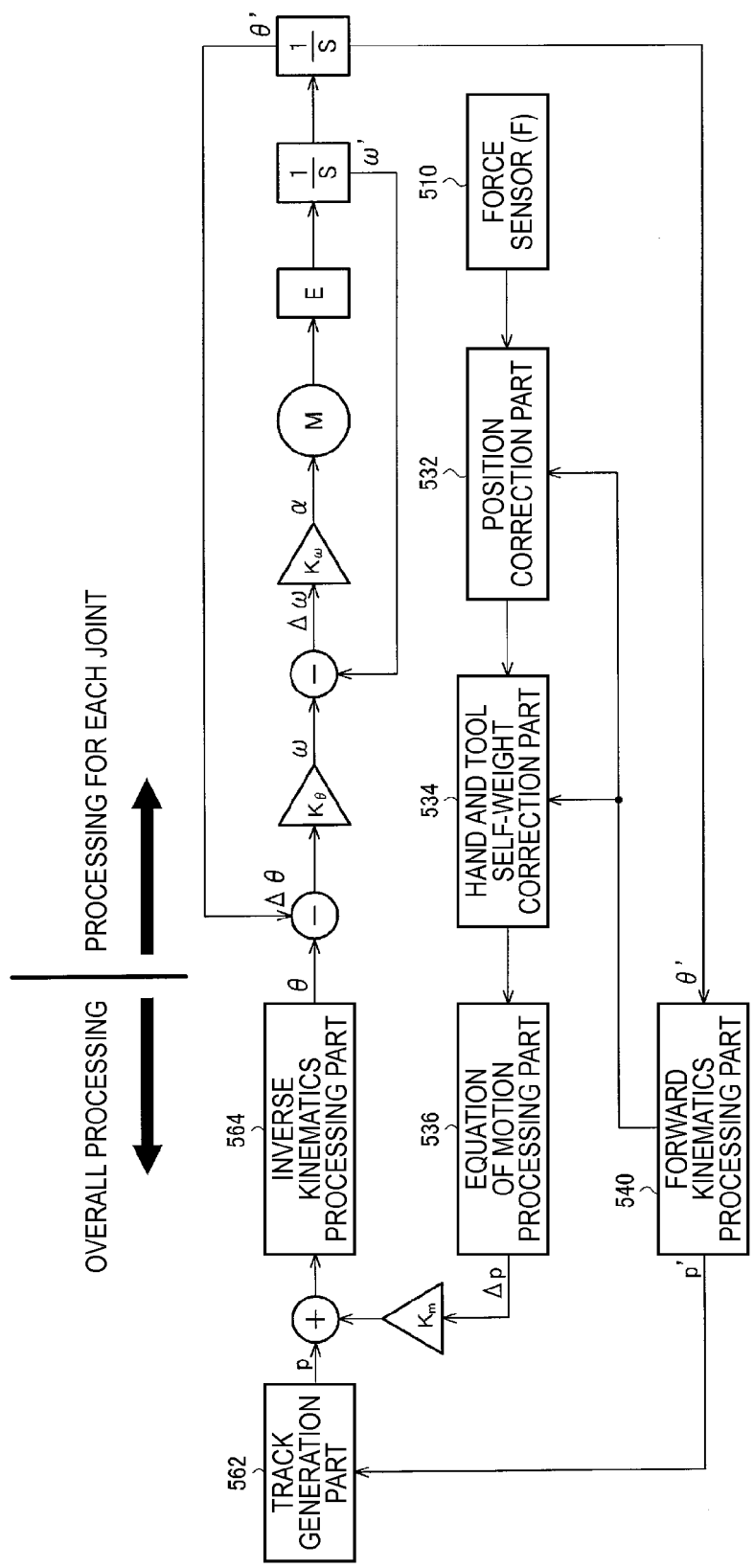
FIG. 8 shows a basic configuration example of a control system including force sense feedback.

FIG. 8 shows a basic configuration example of a control system including force sense feedback. In FIG. 8, compared to FIG. 7, a force sensor 510, a position correction part 532, a hand and tool self-weight correction part 534, an equation of motion processor 536, and a forward kinematics processor 540 are further provided.

In FIG. 8, in response to sensor information from the force sensor 510, the position correction part 532 performs position correction of the sensor and the hand and tool self-weight correction part 534 performs hand and tool self-weight correction. Further, the equation of motion processor 536 performs processing of obtaining a solution of the equation of motion as shown in the above described equation (1), and outputs a correction value Δp. The track information p is corrected according to the correction value Δp, and thereby, correction processing of the joint angle θ as the target value is performed. Further, the forward kinematics processor 540 performs forward kinematics processing, obtains track information p' of the robot, and feeds it back to the track generation part 562. Furthermore, the forward kinematics processor 540 outputs information for specifying the position to the position correction part 532 and the hand and tool self-weight correction part 534. Note that the feedback of the track information p' of the robot to the track generation part 562 is for modification processing of the track based on p' or the like, and the feedback is not always necessary unless the modification processing or the like is performed.

The hand and tool self-weight correction is performed in the hand and tool self-weight correction part 534, and the position correction is performed in the position correction part 532. Here, the hand and tool self-weight correction is correction processing for cancelling out the influence by the self weight of the hand of the robot and the self weight of the tool gripped by the hand from the sensor information (force information) from the force sensor 510. Further, the position correction is correction processing for cancelling out the influence by the position of the force sensor 510 from the sensor information (force information). These hand and tool self-weight correction and position correction may be expressed by the following equation (2), for example.

$$\begin{pmatrix} fx \\ fy \\ fz \\ fu \\ fv \\ fw \\ 1.0 \end{pmatrix} = \begin{bmatrix} Mxx & Mxy & Mxz & Mxu & Mxv & Mxw & Bx \\ Myx & \ddots & & & \ddots & Myw & By \\ Mzx & & & & & Mzw & Bz \\ Mux & & & & & Muw & Bu \\ Mvx & \ddots & & & \ddots & Mvw & Bv \\ Mwx & Mwy & Mwz & Mwu & Mwv & Mww & Bw \\ 0.0 & 0.0 & 0.0 & 0.0 & 0.0 & 0.0 & 1.0 \end{bmatrix} \begin{pmatrix} Fx \\ Fy \\ Fz \\ Fu \\ Fv \\ Fw \\ 1.0 \end{pmatrix} \quad (2)$$

In the equation (2), Fx, Fy, Fz, Fu, Fv, Fw are force information, torque information as the sensor information from the force sensor 510. Further, Bx, By, Bz, Bu, By, Bw are bias terms. Furthermore, fx, fy, fz, fu, fv, fw as corrected sensor information (force information, torque information) are input to the equation of motion processor 536. Note that data includes fixed values, and the substantial number of correction coefficients is 6×7=42. The hand and tool self-weight correction and position correction are known correction processes, and their detailed explanation will be omitted.

1.4 Digital Filter Processing

It is desirable to obtain the solution of the equation of motion (differential equation in a broad sense) in the equation of motion processor 536 in FIG. 8. In the related art, to obtain the solution of the equation of motion, the Newton method, the Runge-Kutta method, or the like has been used. However, these methods are not suitable for realization as hardware, and a determination of stability is difficult. Further, there has been a problem that switching of responsiveness is hard to be accepted.

Accordingly, the applicant uses a digital filter as a method of solving the differential equation for addressing the above described problems.

1.4.1 Solving Method Using Digital Filter of Equation of Motion

The equation of motion is expressed in the form of the above described equation (1). Since the equation of motion is the linear differential equation, when an impulse response as a solution for impulse input is obtained, a solution for an arbitrary external force term may be obtained by convolution of the impulse response and the external force term.

Here, if the step of obtaining the solution of the equation of motion is regarded as a filter of outputting the solution (for example, location information) for the input of the sensor information of the force sensor, the step may be considered as a bipolar analog filter from the form of equation (1).

That is, the solution of the equation of motion may be obtained as the output of the analog filter, and thus, by digitalizing the analog filter, the equation of motion can be solved using a digital filter.

Various methods of digitalizing an analog filter are known and, for example, the impulse invariance method may be used. This is a method of designing a digital filter that provides an impulse response having the same value as a value obtained by sampling of impulse responses of the analog filter in discrete time T. The impulse invariance method is a known method and its detailed explanation will be omitted.

Figure 9:
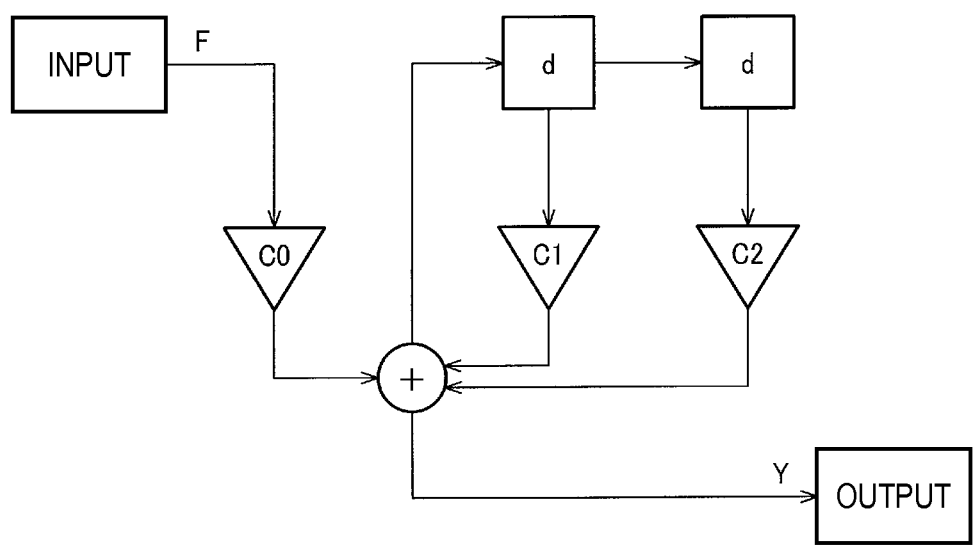
FIG. 9 shows a basic form of a digital filter when a solution of an equation of motion is obtained.

As a result, the solution of the differential equation can be obtained as the output of the digital filter. For the equation of motion, a bipolar digital filter as shown in FIG. 9 is obtained. In FIG. 9, d is a delay per sample, and $C_0$, $C_1$, $C_2$ are coefficients of the digital filter (digital filter parameters). The relationship between an input value F and an output value $Y_n$ of the digital filter in FIG. 9 may be expressed by the following equation (3).

$$Y_n = C_0 F + C_1 Y_{n-1} + C_2 Y_{n-2} \tag{3}$$

The processing using the digital filter is easy to be realized as hardware and a determination of stability is easy as will be described later. Further, by switching the coefficients of the digital filter, the characteristic (whether to move flexibly or rigidly or the like) may be switched or the responsiveness of the solution may be switched by switching the filter drive frequency.

1.4.2 Stability Determination of Digital Filter

In the impedance control, an unstable system may be formed depending on the settings of the mass term (m), the viscosity term ($\mu$), and the elasticity term (k) of the equation of motion. In an extreme example, an oscillating system may be formed such that once force is applied to the robot, the vibration of the robot continues though no further contact. The system with lower stability (degree of stability) is not preferable for practical use, and it is necessary to determine the stability of the system with respect to the equation of motion and take some measures unless the system is stable.

The solution of the equation of motion may be obtained using the above described Newton method, Runge-Kutta method, or the like, however, the determination of stability is impossible. Accordingly, processing of determining stability is performed separately from the processing of obtaining the solution, and it is generally known that the determination processing of stability is not easy.

In the method of the embodiment, the equation of motion is processed using the digital filter, and the determination of stability of the system with respect to the equation of motion is a determination of the stability of the digital filter therefor. The determination of stability of the digital filter may be performed easily and it is necessary to only determine whether or not the pole is within a unit circle.

Figure 10A:
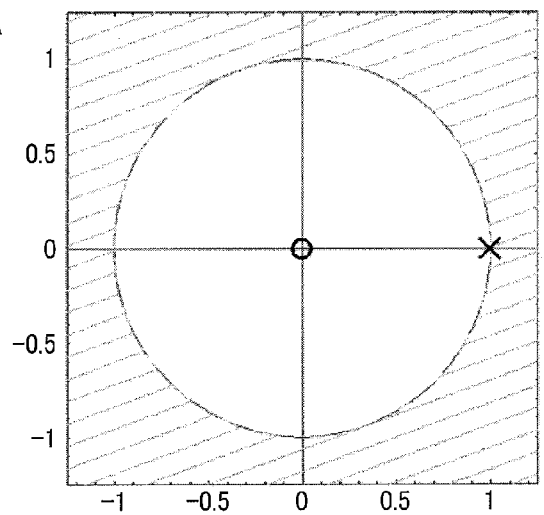
FIGS. 10A to 10C are explanatory diagrams of a stability determination method of the system.
Figure 10B:
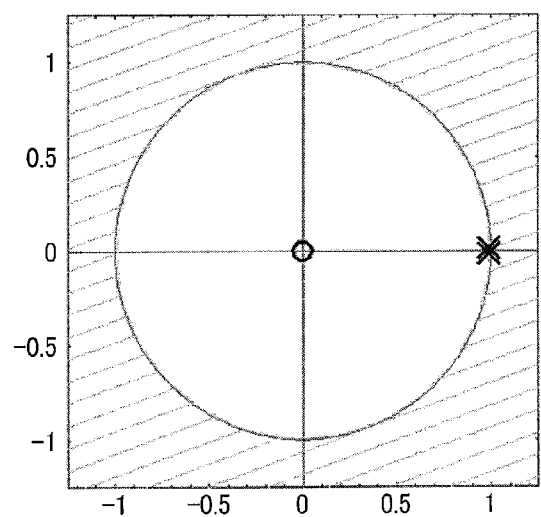
Figure 10C:
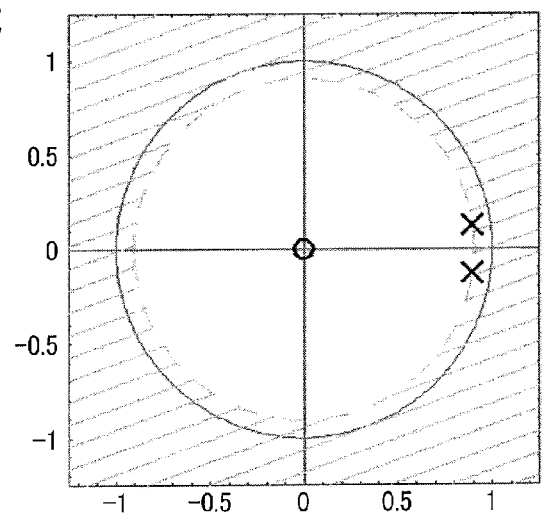

Specifically, FIGS. 10A to 10C show specific examples. These are examples in which the pole is within the unit circle, and, if the pole is outside of the unit circle, the determination that the filter is not stable is made. Further, when the pole is in the location inwardly separate from the circumference of the unit circle to an extent as shown in FIG. 10C, there is no particular problem. However, when the pole is in the location significantly near the unit circle as shown in FIG. 10A (note that FIG. 10A shows the example in which two poles are not double root, but in the locations as near as possible), attention is required. This is because, depending on the mounting method of the digital filter, an error may be produced for the designed value. In the case where the error causes movement of the location of the pole toward the outside of the unit circle, the digital filter with little margins of stability as shown in FIG. 10A may perform unstable operation when mounted though it is stable in design, and some measures are necessary.

1.4.3 Configuration Example using Digital Filter

Figure 11:
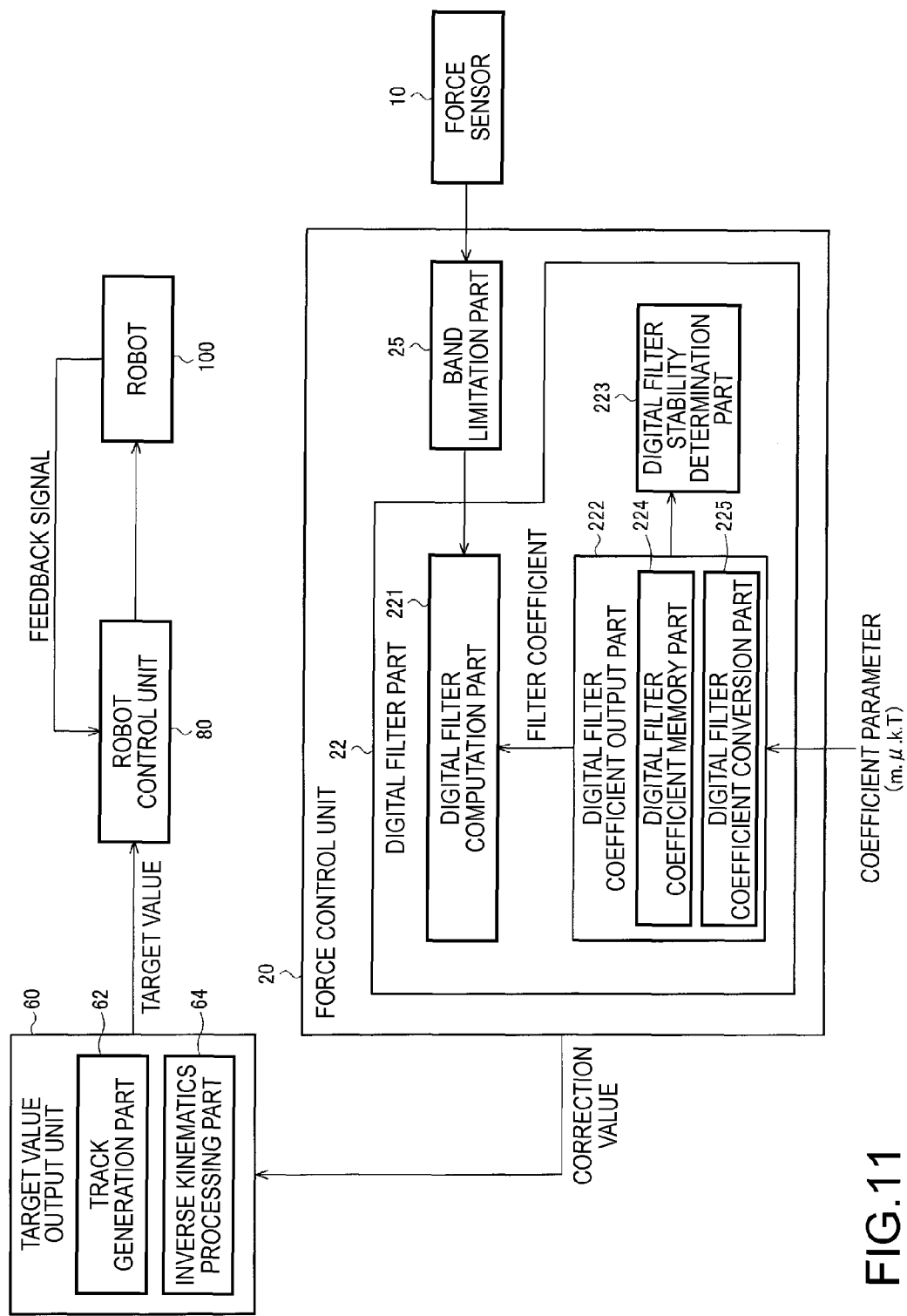
FIG. 11 shows a basic configuration example of a robot controller and a robot system using the digital filter.

FIG. 11 shows a configuration example of a robot controller and a robot system including the controller when the solution of the equation of motion is obtained using the digital filter. Note that the robot controller and the robot system of the embodiment are not limited to those having the configuration in FIG. 11, and various modifications can be made by omitting part of their component elements and adding other component elements.

The force sensor 10, the target value output unit 60, the robot control unit 80, and the robot 100 are the same as those in FIG. 1, and their detailed explanation will be omitted.

A force control unit 20 includes a digital filter 22. The digital filter 22 performs digital filter processing on sensor information from the force sensor (including information formed by performing correction processing and band limitation processing on the sensor information), and outputs an output value as a correction value to the target value output unit 60. Further, the force control unit 20 may include a band limitation part 25 that performs band limitation processing on the sensor information.

The digital filter 22 includes a digital filter computation part 221, a digital filter coefficient output part 222, and a digital filter stability determination part 223. The digital filter computation part 221 obtains the solution of the equation of motion by performing the digital filter processing based on sensor information and a digital filter coefficient. The digital filter coefficient output part 222 obtains the digital filter coefficient based on coefficient parameters (mass term m, viscosity term $\mu$, and elasticity term k, and drive frequency T) of the equation of motion, and outputs the coefficient to the digital filter computation part 221 and the digital filter stability determination part 223. The digital filter stability determination part 223 performs determination of the stability of the digital filter based on the digital filter coefficient.

The digital filter coefficient output part 222 may include a digital filter coefficient memory part 224 and a digital filter coefficient convertor 225. The digital filter coefficient convertor 225 converts the coefficient parameters of the equation of motion into the digital filter coefficient. The digital filter coefficient memory part 224 stores the converted digital filter coefficient. By storing plural digital filter coefficients in the digital filter coefficient memory part 224 in advance, the movement characteristic of the robot and the responsiveness of the solution can be switched by switching the digital filter coefficient to be output.

1.5 Nonlinear Impedance Control

Next, the outline of nonlinear impedance control realized in the first embodiment and the second embodiment to be described will be explained using FIGS. 12A to 12C.

In the first embodiment and the second embodiment, force control by which a relationship between the magnitude of external force applied to the force sensor and the magnitude of displacement of the robot when external force is applied is nonlinear is performed.

Figure 12A:
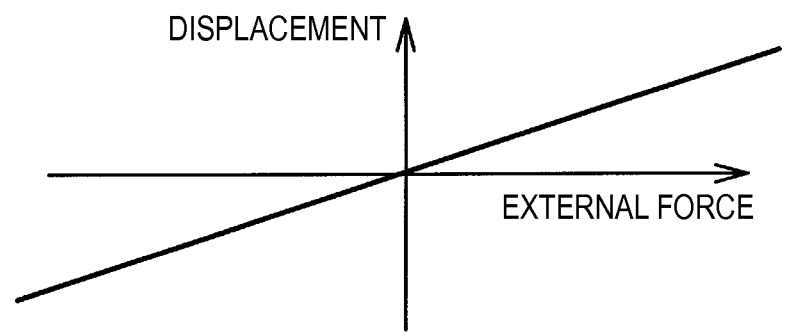
FIGS. 12A to 12C are explanatory diagrams of nonlinear impedance control.

Specifically, first, FIG. 12A shows an example of linear impedance control. The graph of FIG. 12A shows a state in which as the external force is larger, the displacement becomes larger in proportion. The relationship holds between external force and displacement in the above described FIGS. 5A, 5B, and 6A to 6C.

Figure 12B:
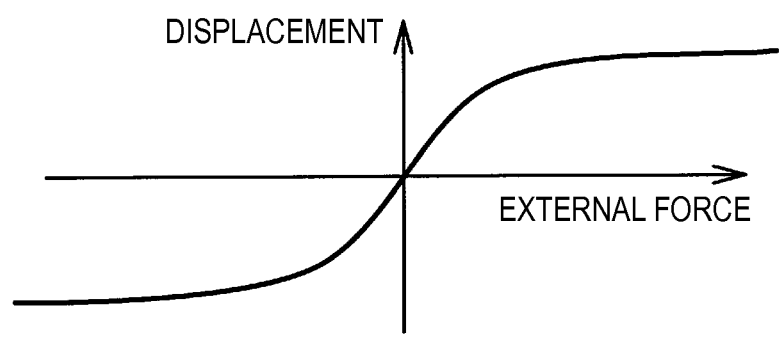

Next, FIG. 12B shows an example of nonlinear impedance control of suppressing increase in displacement when the external force is larger than a predetermined threshold value. That is, the control promotes increase in external force to be produced as the displacement becomes larger. By performing the nonlinear impedance control, even when there is the protrusion OBS2 that can not be scraped unless large force is applied as shown in FIGS. 6A to 6C, for example, necessary force may be produced without an increase in displacement (without setting of the target location PD2 farther). As a result, even after the protrusion OBS2 is scraped, the manipulator is prevented from moving too much. Note that, in the graph of FIG. 12B, a slant is necessary for unique relationship between external force and displacement, and the gradient is not set to zero no matter how much the external force is increased.

Figure 12C:
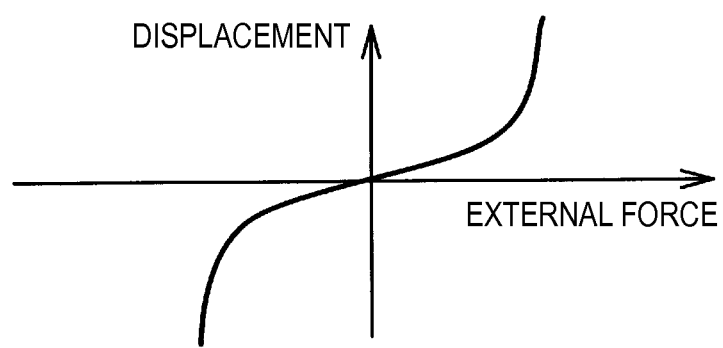

Further, FIG. 12C shows an example of nonlinear impedance control of suppressing an increase in external force (drag) when the displacement is larger than a predetermined threshold value. In other words, the control is nonlinear impedance control of significantly increasing the displacement when the external force is large. By performing the nonlinear impedance control, when the object OB is grasped as shown in FIG. 5A, for example, the displacement can be made larger without crushing of the object OB.

Below, the first embodiment and the second embodiment that realize nonlinear impedance control as shown in FIGS. 12B and 12C will be explained on the basis of the configuration in FIG. 11. The first embodiment is an example of realizing nonlinear impedance control by performing linear digital filter processing, and then, performing filter processing on an output value. The second embodiment is an example of realizing nonlinear impedance control by performing filter processing on an input value of a digital filter, and then, performing linear digital filter processing.

2. First Embodiment 2.1 Configuration

Figure 13:
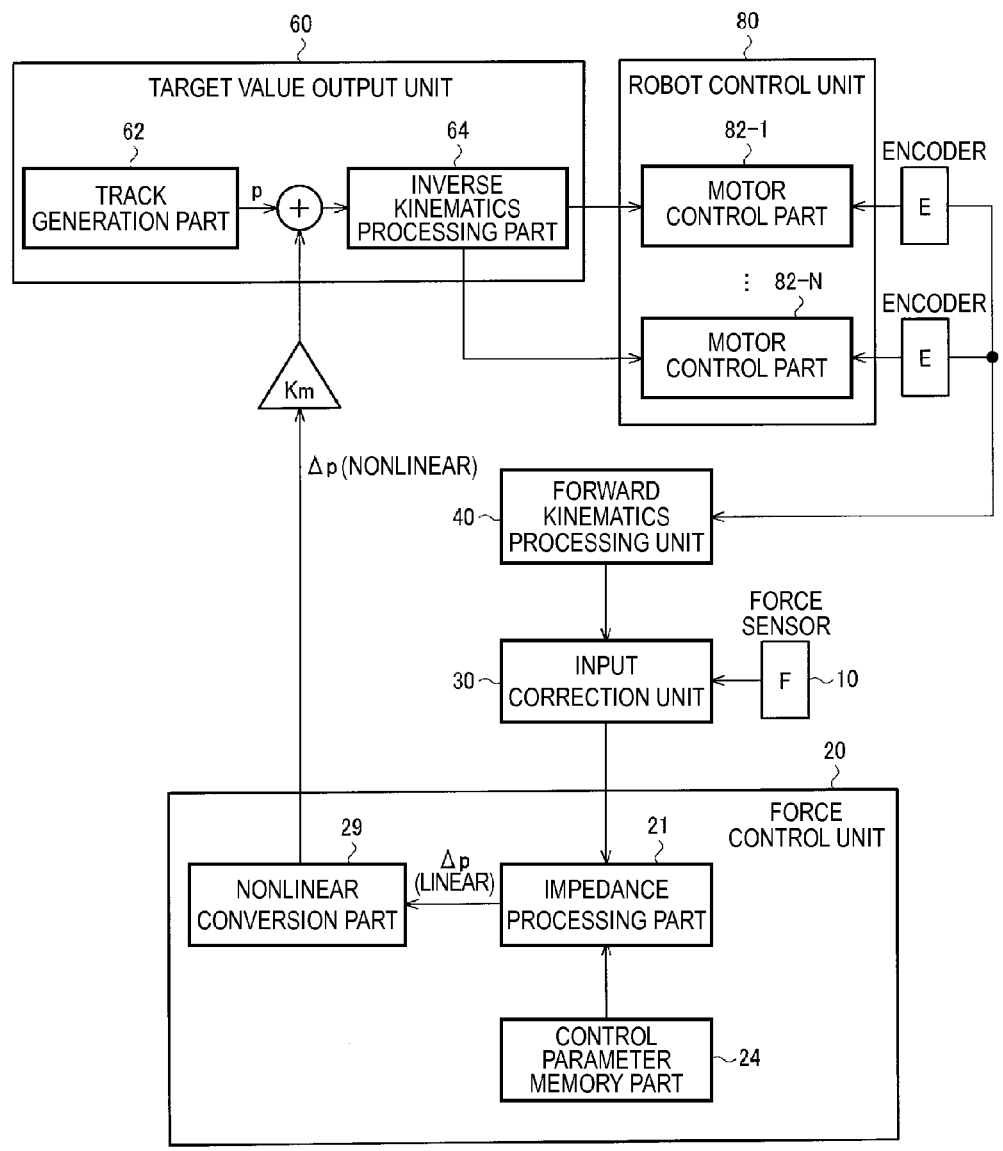
FIG. 13 shows a detailed system configuration example of the first embodiment.

FIG. 13 shows a configuration example of a robot controller according to the first embodiment.

The force sensor 10, the target value output unit 60 (the track generation part 62 and the inverse kinematics processor 64), the robot control unit 80 (the motor control part 82-1 to the motor control part 82-N) are the same as those in FIG. 1, and their detailed explanation will be omitted. Further, an input correction unit 30 performs correction processing on the detected sensor value (sensor information), and may include the position correction part 532, the hand and tool self-weight correction part 534 of FIG. 8, for example. A forward kinematics processing unit 40 corresponds to the forward kinematics processor 540 in FIG. 8, and outputs a result of forward kinematics processing to the input correction unit 30, and the unit may output the result to the track generation part 62 as desired.

Further, the force control unit 20 of the robot controller includes an impedance processor 21, a control parameter memory part 24, and a nonlinear convertor 29. Note that the force control unit 20 of the embodiment is not limited to that having the configuration in FIG. 13, and various modifications can be made by omitting part of its component elements and adding other component elements.

Furthermore, the impedance processor 21 in FIG. 13 corresponds to the digital filter computation part 221 in FIG. 11 and operates in the same manner, and its explanation will be omitted.

In addition, the control parameter memory part 24 in FIG. 13 corresponds to the digital filter coefficient memory part 224 in FIG. 11 and stores control parameters. Here, the control parameter may be a coefficient parameter of an equation of motion, which will be described later, or a parameter of a digital filter. Further, an offset parameter may be stored as the control parameter. The function of the control parameter memory part may be realized using a memory such as a RAM, an HDD (hard disc drive), or the like, and, in practice, may be formed using one memory or the like or plural memories or the like.

Further, the nonlinear convertor 29 performs filter processing on an output value of the impedance processor and outputs a correction value. The correction values (output values, responses) before and after filter processing will be described later using FIG. 17.

Figure 14:
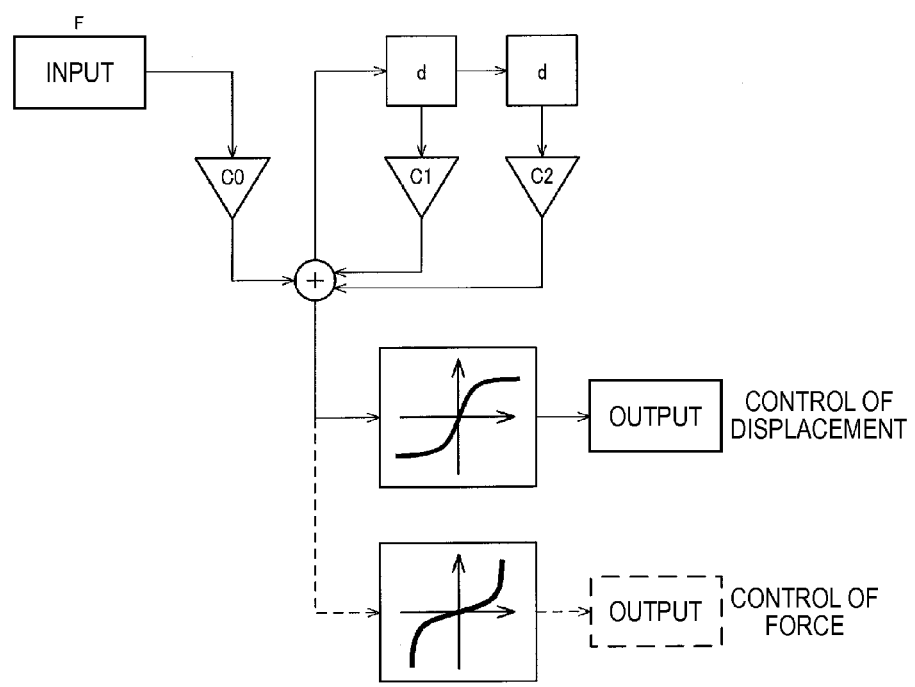
FIG. 14 shows a digital filter of the first embodiment.

Here, the digital filter in the first embodiment is as shown in FIG. 14. In the digital filter shown in FIG. 14, as expressed in equation (4), a value (Output) formed by performing filter processing on the output value $Y_n$ (see equation (3)) of the digital filter in FIG. 9 using filter processing function G is obtained as the correction value (output value). In equation (4), the function G according to the purpose such as the case of controlling the displacement or the case of controlling the force is used.

$$\text{Output} = G(Y_n) \quad (4)$$

According to the processing using the digital filter shown in FIG. 14, realization as hardware is easy and a determination of stability is also easy.

2.2 Detailed Processing

Figure 15:
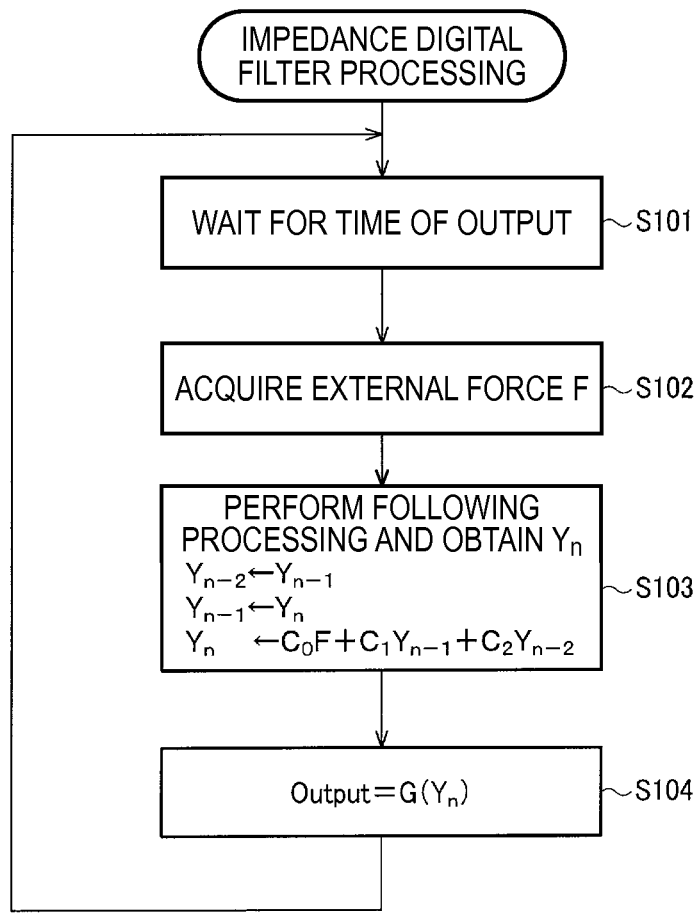
FIG. 15 is a flowchart for explanation of impedance digital filter processing of the first embodiment.
Figure 16:
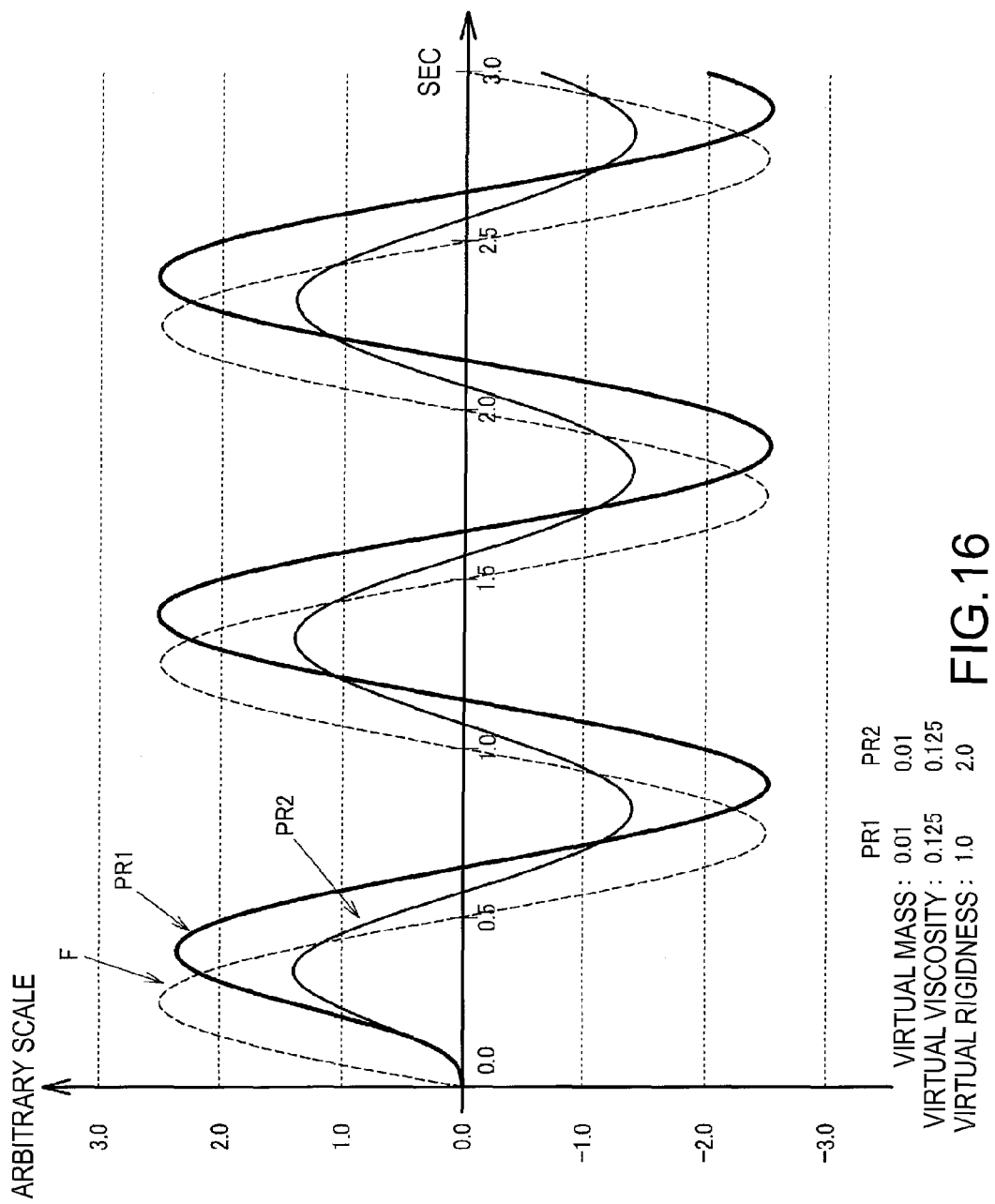
FIG. 16 shows linear impedance control response examples for sinusoidal external force.
Figure 17:
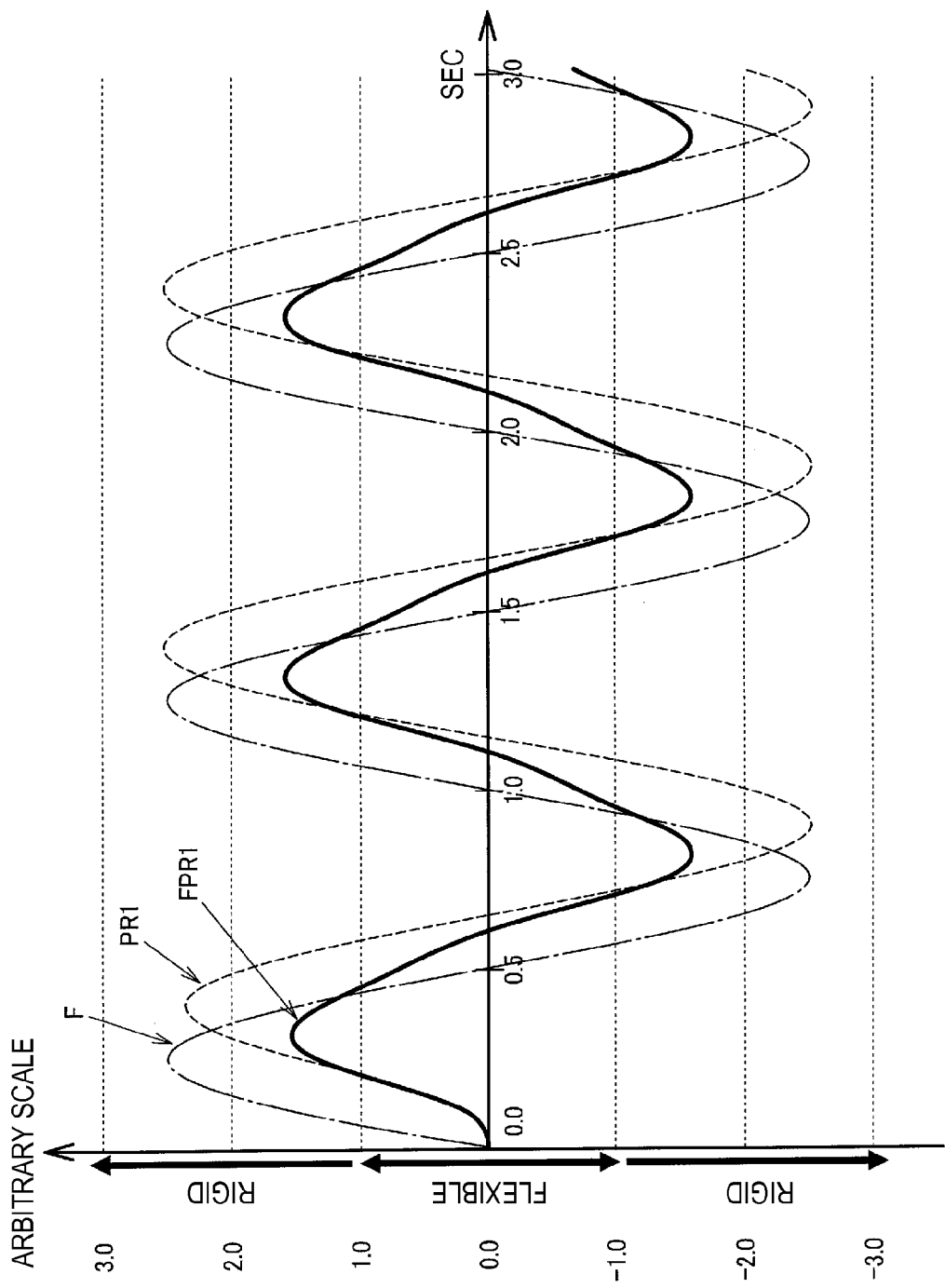
FIG. 17 shows nonlinear impedance control response examples for sinusoidal external force.

Next, a flow of the digital filter processing performed by the force control unit in the embodiment will be explained using a flowchart in FIG. 15. Further, FIG. 16 shows linear impedance control response examples for sinusoidal external force, and FIG. 17 shows nonlinear impedance control response examples for sinusoidal external force. Here, the explanation of FIG. 16 will be made first, and then, the explanation of FIG. 17 will be made with the explanation of the flow chart of FIG. 15.

First, FIG. 16 shows curved lines of external force F with the horizontal axis of an arbitrary scale and the horizontal axis of time (seconds). Further, FIG. 16 shows responses of linear impedance control on external force F when the coefficient parameters (virtual mass, virtual viscosity, virtual rigidity) of the equation of motion are set to PR1 and PR2 shown in the drawing, respectively. Further, the drive frequency is set to 125 microseconds (8 k samples/sec) the same as the frequency of the current control loop of the manipulator, and external force is sinusoidal wave having a period of one second.

In PR1 and PR2 of FIG. 16, the virtual masses m and the virtual viscosities μ are the same, but the virtual rigidity k is twice as large in PR2 than in PR1. Accordingly, the robot responds like the so-called flexible spring in setting of PR1, and responds like the more rigid spring in setting of PR2 twice that of the setting of PR1. Note that, because of the viscosity term and mass term, the phase of the response in setting of PR1 or PR2 is out of the phase of external force.

Next, the explanation of FIG. 17 will be made. The external force F, the response in setting of PR1 and the other settings shown in FIG. 17 are the same as those in the case of FIG. 16. In FIG. 17, filter processing is performed on the curved line of PR1 (the output value of the impedance processor in setting of PR1), and a response curve (FPR1) when nonlinear impedance control is realized is newly added.

As the flow of the digital filter processing, first, an output time is waited (S101) and, at the output time, the external force (external force value) F after position correction is acquired from the input correction unit (S102).

Then, equation (3) is calculated and $Y_n$ is obtained (S103). The value of $Y_n$ is shown in the graph of FIG. 17 as the curved line of PR1.

Further, filter processing is performed on the obtained $Y_n$, and an output value (Output) is obtained (S104). In FIG. 17, the curve of FPR1 shows the value of Output. Note that, in the embodiment, for example, a sigmoid function is used as the filter processing function. The sigmoid function is a function of providing the maximum entropy state of the binary system, and appears in various situations. Here, the maximum entropy has no special significance.

The above described robot controller of the embodiment includes the force control unit 20 that outputs the correction value of the target track of the robot 100 based on the detected sensor value acquired from the force sensor 10, the target value output unit 60 that performs correction processing on the target track based on the correction value and obtains the target value, and outputs the obtained target value, and the robot control unit 80 that performs feedback control of the robot 100 based on the target value. Further, the force control unit 20 includes the impedance processor 21 that obtains the solution of the differential equation in force control as the correction value before conversion processing, and the nonlinear convertor 29 that obtains the correction value after the conversion processing by performing nonlinear conversion processing on the correction value before the conversion processing acquired from the impedance processor and outputs the obtained correction value after the conversion processing.

That is, the control unit 20 includes the impedance processor 21 that obtains the solution of the differential equation in force control as a value used for obtaining the correction value, and the nonlinear convertor 29 that obtains the correction value by performing nonlinear conversion processing on the solution of the differential equation acquired from the impedance processor 21 and outputs the obtained correction value.

First, the force control unit 20 obtains the correction value of the target track of the robot 100 based on the detected sensor value acquired from the force sensor 10, and outputs the obtained correction value.

Here, the detected sensor value (sensor information) may be the output value from the force sensor 10 itself or a value obtained by performing correction processing on the output value using the input correction unit 30. Further, the value may be a value obtained by band limitation processing using a band limitation part 25 (shown in FIG. 11). Furthermore, the value may be information mathematically equal to them.

Furthermore, the correction value is a value obtained by the force control unit 20 and used for correction of the target track by the target value output unit 60. For example, the correction value is the displacement shown in the graphs of FIGS. 12B and 12C. The displacement shown in the graphs of FIGS. 12B and 12C is the response (output) of the impedance control for external force, but not a value indicating a distance or the like when the manipulator or the like of the robot 100 actually moves. Accordingly, the displacement is also referred to as virtual displacement for discriminating the displacement from the displacement when the manipulator or the like of the robot 100 actually moves. Note that the correction value before conversion processing may be restated as an intermediate value or an intermediate correction value.

Further, the target value output unit performs correction processing on the target track based on the correction value and obtains the target value.

Here, the target value is the target value in the feedback control of the robot 100, and the control in the robot control unit 80 is performed based on the target value. The target value may be acquired by performing the correction processing using the correction value on the target track.

Further, the target track may represent the change of the spatial target location of the end effector part (end point) of the robot 100 in a narrow sense. One target location is expressed by three-dimensional spatial coordinates xyz (rotation angles uvw around the respective axes may be added in consideration of position), for example, and the target track is a collection of the target locations. Note that the target track is not limited to that, but may be a collection of target joint angles of the robot 100. In the robot 100 having joints, when the angles of the respective joints are determined, the location of the end effector part is uniquely determined by forward kinematics processing. That is, in an N-joint robot, one target location may be represented by N joint angles ($\theta 1$ to $\theta N$), and, if a collection of the N joint angles is treated as one target joint angle, the target track may be considered as the set of target joint angles. Therefore, the correction value output from the force control unit 20 may be a value related to the location or a value related to the joint angle.

Figure 22A:
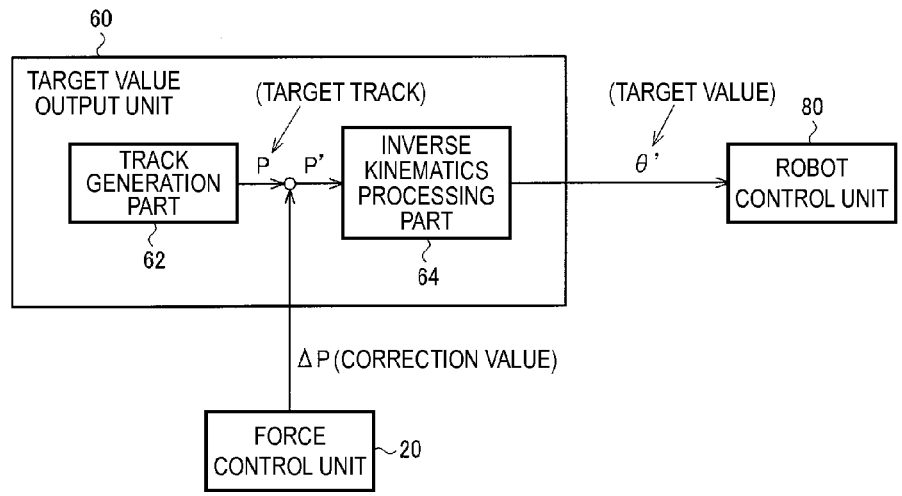
FIGS. 22A and 22B show specific systems of obtaining target tracks, correction values, and target values.
Figure 22B:
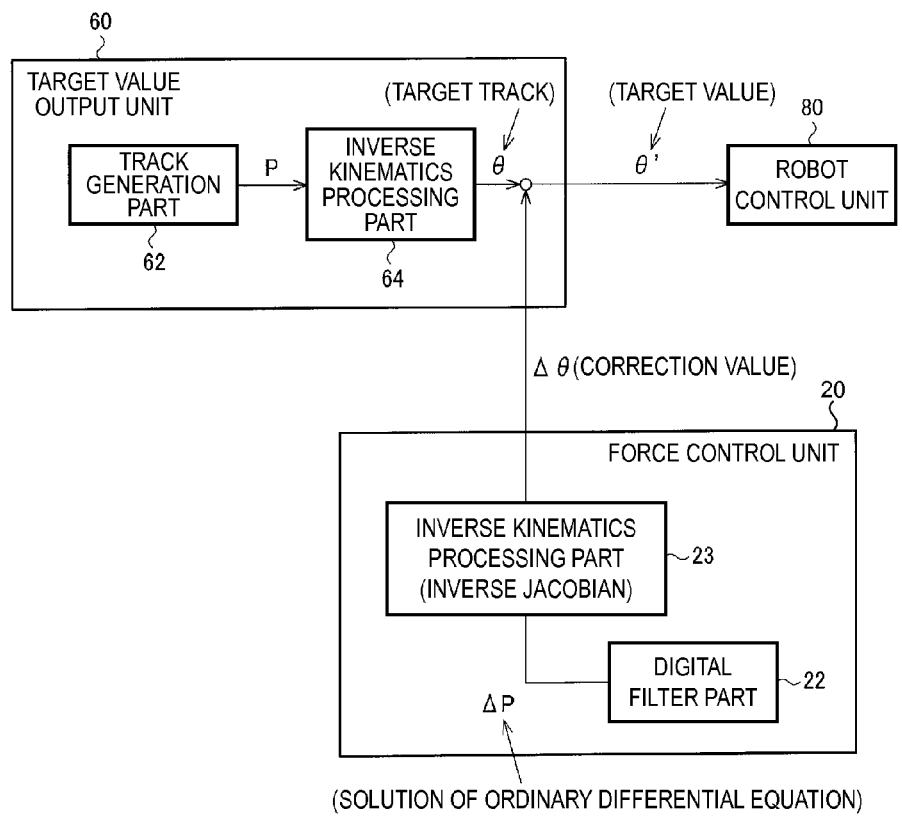

FIGS. 22A and 22B show specific examples. If the equation of motion of the equation (1) is used as the differential equation in the force control, the solution of the equation of motion is a value related to the location. Therefore, when the target track is the target location, the solution may be used as the correction value without change, and the system configuration example is as shown in FIG. 22A. Note that the target value may be the value related to the location or the value related to the joint angle, and the feedback control of the robot 100 using joint angles is generally assumed.

On the other hand, separately from the inverse kinematics processor 64 of the target value output unit 60, the case where the force control unit 20 includes an inverse kinematics processor 23 as shown in FIG. 22B is considered. For example, the case is a case where the times of processing and processing rates are different between the target track generation processing in the target value output unit 60 and the correction value output processing in the force control unit 20 or the like. In this case, the target track is the target joint angle and the force control unit 20 performs conversion processing (for example, inverse kinematics processing) on the solution of the equation of motion and uses it as the correction value.

Further, the differential equation in the force control refers to a differential equation requiring obtainment of the solution in the force control. In a narrow sense, the equation may be a linear differential equation. In the narrower sense, the equation is an differential equation requiring obtainment of the solution so that the robot may behave as if it had desired properties (mass, viscosity, elasticity, or the like), and may be the equation of motion as shown in equation (1).

Then, the nonlinear convertor 29 obtains the correction value after the conversion processing by performing nonlinear conversion processing on the correction value before the conversion processing acquired from the impedance processor 21. The first embodiment is different from the second embodiment to be described later in that filter processing is performed on the output value of the impedance processor 21. Specifically, the filter processing is performed using the sigmoid function or the like as described above, however, the filter processing function is not limited to that and a function according to the purpose can be used. For example, in FIG. 17, filter processing by which the larger the external force, the harder the correction value (virtual displacement) becomes larger is performed. That is, in FIG. 17, the nonlinear impedance control as shown in FIG. 12B is realized.

By performing the filter processing on the output value of the linear impedance processing, the nonlinear impedance control may be realized. Specifically, for example, as described above, the movement of the manipulator caused when the external force suddenly disappears may be limited within a predetermined range regardless of the magnitude of the external force. Or, the external force (drag) may be limited within a predetermined range. This is very effective in practice and enhances the safety of the robot.

Further, the robot controller of the embodiment is a combination of linear systems, and thus, a determination of stability of the solution of the equation of motion is easy.

Furthermore, the force control unit 20 may perform force control by which the first amount of displacement change and the second amount of displacement change are different in the case where the amount of displacement change with respect to external force when the virtual displacement is the first displacement and is the first amount of displacement change and the amount of displacement change when the virtual displacement is the second displacement different from the first displacement is the second amount of displacement change.

For example, the force control unit 20 may perform nonlinear conversion processing so that the first amount of displacement change may be larger than the second amount of displacement change when the virtual displacement is the first displacement and is larger than the second displacement, and output the correction value.

Here, the amount of displacement change refers to the amount of change of displacement with respect to external force. For example, in the graph of FIG. 12B, the amount of displacement change refers to the gradient of the curved line indicating the displacement. In other words, when force is applied to the manipulator of the robot from a fixed direction, the instantaneous displacement of the manipulator is measured while the force is gradually changed, and graphically plotted as shown in FIG. 12B, the gradient of the graph with respect to external force having a certain magnitude is the amount of displacement change.

Accordingly, for confirmation of the amount of displacement change, for example, the first external force, the second external force, the third external force having different magnitudes from each other are applied to the manipulator, and the displacement of the manipulator when the first external force is applied, the displacement when the second external force is applied, and the displacement when the third external force is applied are respectively obtained. Then, the difference between the displacement of the manipulator when the first external force is applied and the displacement when the second external force is applied and the difference between the displacement when the second external force is applied and the displacement when the third external force is applied may be confirmed as the amounts of displacement change. Note that, if the difference between the first external force and the second external force (the second external force and the third external force) is small, the same value as the gradient of the graph may be obtained. That is, the amount of displacement change may be the difference between the displacement when the first external force is applied and the displacement when the second external force different from the first external force is applied. In this regard, the difference between first external force and the second external force may be little. Here, "small" refers to "close to zero".

Further, when the amount of displacement change is confirmed as described above, if the displacement becomes larger in proportion to the external force, it is known that the relationship as shown in FIG. 12A holds between the displacement and the external force, and, if the displacement does not become larger even when the external force is made larger, it is known that the relationship as shown in FIG. 12B holds between the displacement and the external force.

By performing force control by which the first amount of displacement change and the second amount of displacement change are different in the above described manner, the nonlinear impedance control may be realized. For example, force control by which the larger the absolute value of the virtual displacement (or external force), the larger the amount of displacement change or the like can be performed. That is, the force control as shown in the graph of FIG. 12C can be performed. Specifically, the manipulator is hard to be pressed in as if the manipulator acted repulsively as long as the force applied to the manipulator of the robot is small to some extent, however, when the force applied to the manipulator becomes larger, the manipulator moves in response to the applied force without resistance. Therefore, even when the object to be grasped by the manipulator of the robot is breakable, the external force (drag) may be limited within the predetermined range by performing the control of significantly increasing the displacement as shown in FIG. 12C when the external force is large. This is very effective in practice and enhances the safety of the robot.

Further, the force control unit 20 may perform nonlinear conversion processing so that the first amount of displacement change may be smaller than the second amount of displacement change when the virtual displacement is the first displacement larger than the second displacement, and output the correction value.

Thereby, for example, the force control by which the larger the absolute value of the virtual displacement (or external force), the smaller the amount of displacement change or the like can be performed. That is, the force control as shown in FIG. 12B can be performed. Specifically, the manipulator is easy to be pressed in as long as the force applied to the manipulator of the robot is small to some extent and the manipulator moves in response to the applied force, however, when the force applied to the manipulator is larger, the manipulator becomes hard to be pressed in as if the manipulator acted repulsively. Therefore, even when the external force suddenly disappears, the movement of the manipulator may be limited within the predetermined range by performing the control of limiting the displacement if the external force is larger as shown in FIG. 12B.

Further, modification such that, in a combination of the force controls, force control by which the larger the absolute value of the virtual displacement, the larger the amount of displacement change is performed when the first displacement is within the first range and force control by which the larger the absolute value of the virtual displacement, the smaller the amount of displacement change is performed when the first displacement is within the second range or the like can be implemented.

Furthermore, the force control unit 20 may perform the first force control when the direction of the virtual displacement with respect to the robot 100 corresponding to the correction value is the first direction and perform the second force control different from the first force control when the direction of the virtual displacement is the second direction opposite to the first direction.

Figure 18:
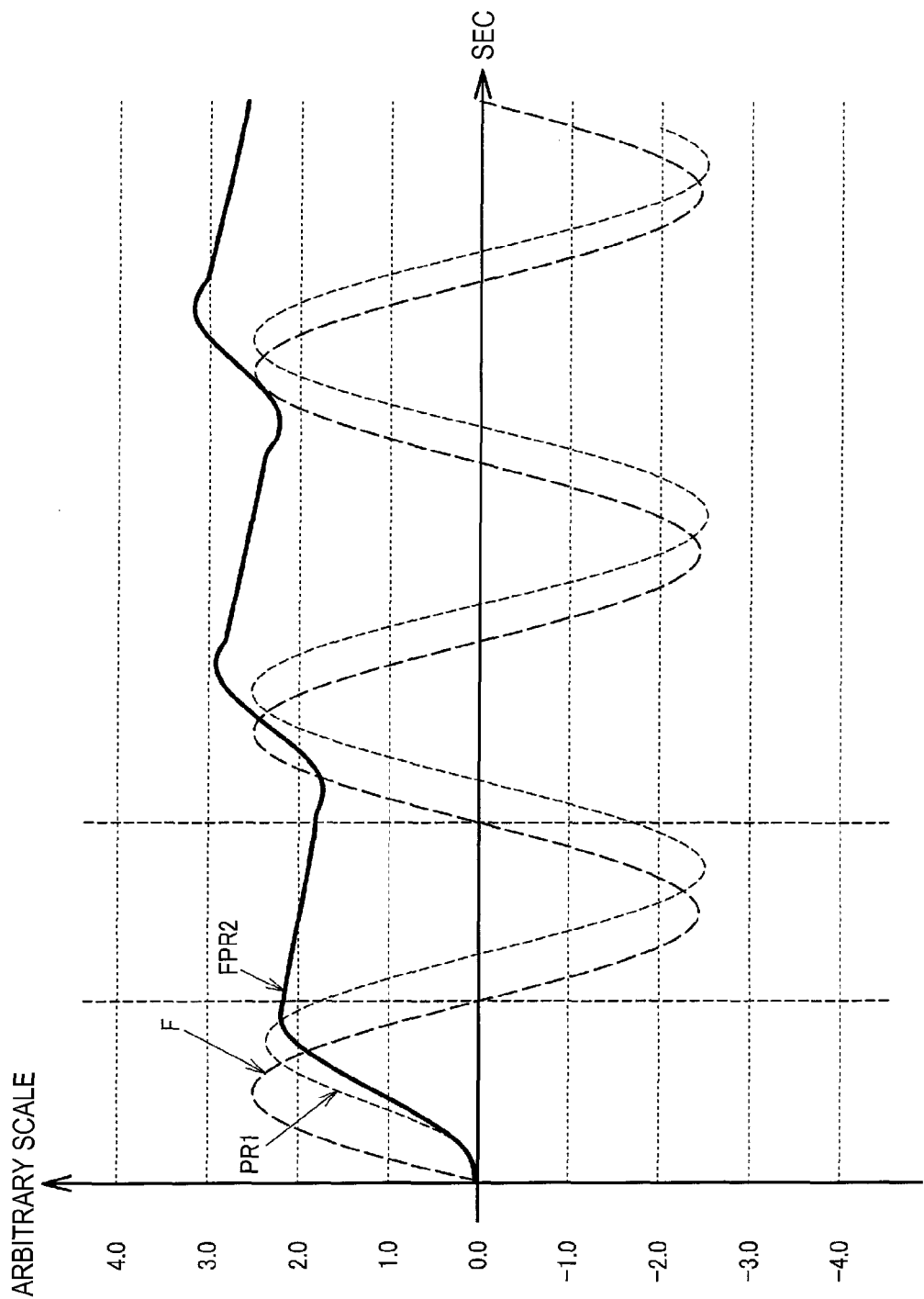
FIG. 18 shows nonlinear asymmetric impedance control response examples for sinusoidal external force.

FIG. 18 shows specific examples. The settings in FIG. 18 are the same as those in FIG. 17, however, the filter processing function used is different. In the example of FIG. 18, the first force control of easily increasing the correction value (output value) is performed when the virtual displacement direction in the graph of the same drawing is the positive direction (i.e., the gradient of PR1 is positive), and the second force control of hardly increasing the correction value is performed when the virtual displacement direction is the negative direction (i.e., the gradient of PR1 is negative).

For example, the case where a pencil is sharpened with a pencil sharpener is considered. In this case, the force control of increasing the virtual displacement can be performed in the direction in which the pencil is pressed into the pencil sharpener (first direction), and the force control of decreasing the virtual displacement can be performed in the direction in which the pencil is pulled out from the pencil sharpener (second direction). In this example, the pencil becomes easier to be pressed into the pencil sharpener, and the pencil becomes harder to be pulled out from the pencil sharpener.

Thereby, switching of force control to be executed or the like can be performed based on the virtual displacement direction. Note that whether to perform the first force control or the second force control may be determined based on the external force direction, not the virtual displacement direction. That is, the force control unit 20 may perform the first force control when the external force direction indicated by the detected sensor value is the first direction and may perform the second force control different from the first force control when the external force direction is the second direction opposite to the first direction.

Further, the nonlinear convertor 29 may perform nonlinear conversion processing using a sigmoid function on the correction value before conversion processing acquired from the impedance processor 21 or the detected sensor value acquired from the force sensor 10.

Thereby, nonlinear conversion processing using a sigmoid function or the like can be performed.

Furthermore, the impedance processor 21 may have a digital filter 22 that obtains the solution of the differential equation in the force control as the correction value.

Thereby, the necessary processing of obtaining the solution of the differential equation in the force control can be performed using the digital filter, and realization as hardware is easier than that in the case where the method of the Newton method, the Runge-Kutta method, or the like is used or the case where the sliding mode control as shown in the above described JP-A-2011-8360 is performed. Further, by switching the digital filter to be used for the digital filter processing (for example, switching the filter coefficient), the response characteristic can be easily switched.

Furthermore, the force control unit 20 may obtain the solution of the differential equation in the force control as the correction value when the stability of the operation of the digital filter 22 obtaining the correction value is determined and the determination that the operation of the digital filter 22 is stable is made.

Thereby, a determination of the stability of the digital filter or the like can be performed. The coefficient parameters of the differential equation may form a practically impossible system (for example, an oscillating robot or the like) depending on the settings. Accordingly, the determination of the stability of the differential equation is necessary, and the determination becomes easier using the digital filter.

Further, the differential equation may be an equation of motion with the virtual mass term, the virtual viscosity term, and the virtual elasticity term as coefficient parameters.

Thereby, obtainment of the solution of the equation of motion or the like can be performed. Therefore, the robot 100 can be allowed to behave as if it had the mass corresponding the virtual mass term, the viscosity corresponding to the virtual viscosity term, and the elasticity corresponding to the virtual elasticity term.

In addition, another embodiment of the invention relates to a robot system including the robot controller and the robot 100 that allows the respective parts to operate based on the target value acquired from the target value output unit 60.

Thereby, realization not only of the robot controller, but also of a robot system that executes processing of the embodiment or the like can be performed.

3. Second Embodiment 3.1 Configuration

Figure 19:
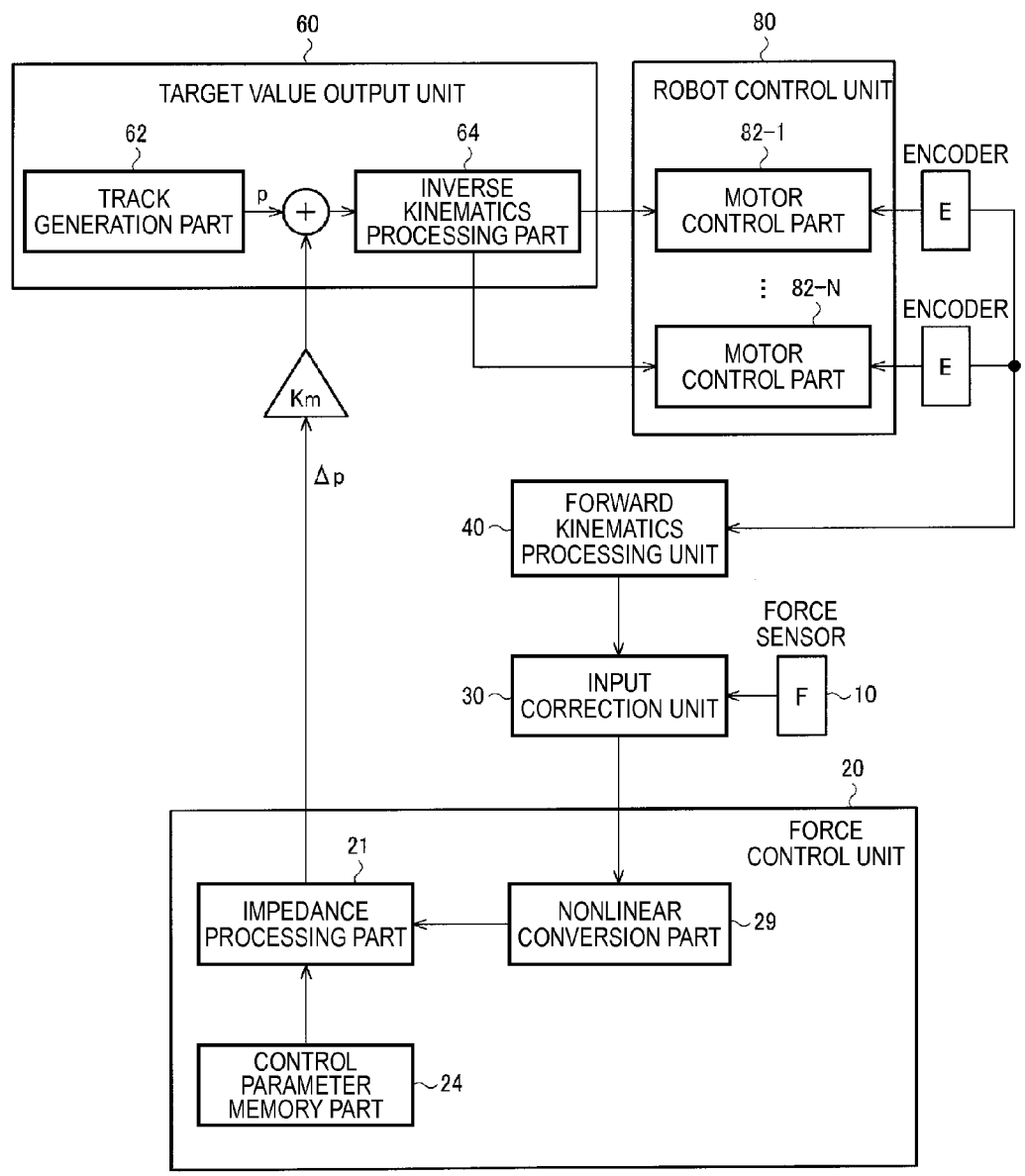
FIG. 19 shows a detailed system configuration example of the second embodiment.

FIG. 19 shows a configuration example of a robot controller according to the second embodiment.

The force sensor 10, the input correction unit 30, the forward kinematics processing unit 40, the target value output unit 60 (the track generation part 62 and the inverse kinematics processor 64), the robot control unit 80 (the motor control part 82-1 to the motor control part 82-N), are the same as those of the first embodiment shown in FIG. 13, and their detailed explanation will be omitted.

Further, like FIG. 13, the force control unit 20 of the robot controller includes an impedance processor 21, a control parameter memory part 24, and a nonlinear convertor 29. Note that the controller is different from that of the first embodiment in that the impedance processor 21 and the nonlinear convertor 29 are oppositely arranged.

Accordingly, the nonlinear convertor 29 performs filter processing on an external value I acquired from the input correction unit 30, and outputs the external force F after nonlinear conversion processing to the impedance processor 21. Note that the force control unit 20 of the embodiment is not limited to that having the configuration in FIG. 19, and various modifications can be made by omitting part of their component elements and adding other component elements. Further, the operations of the other component elements are the same as those of the first embodiment.

Figure 20:
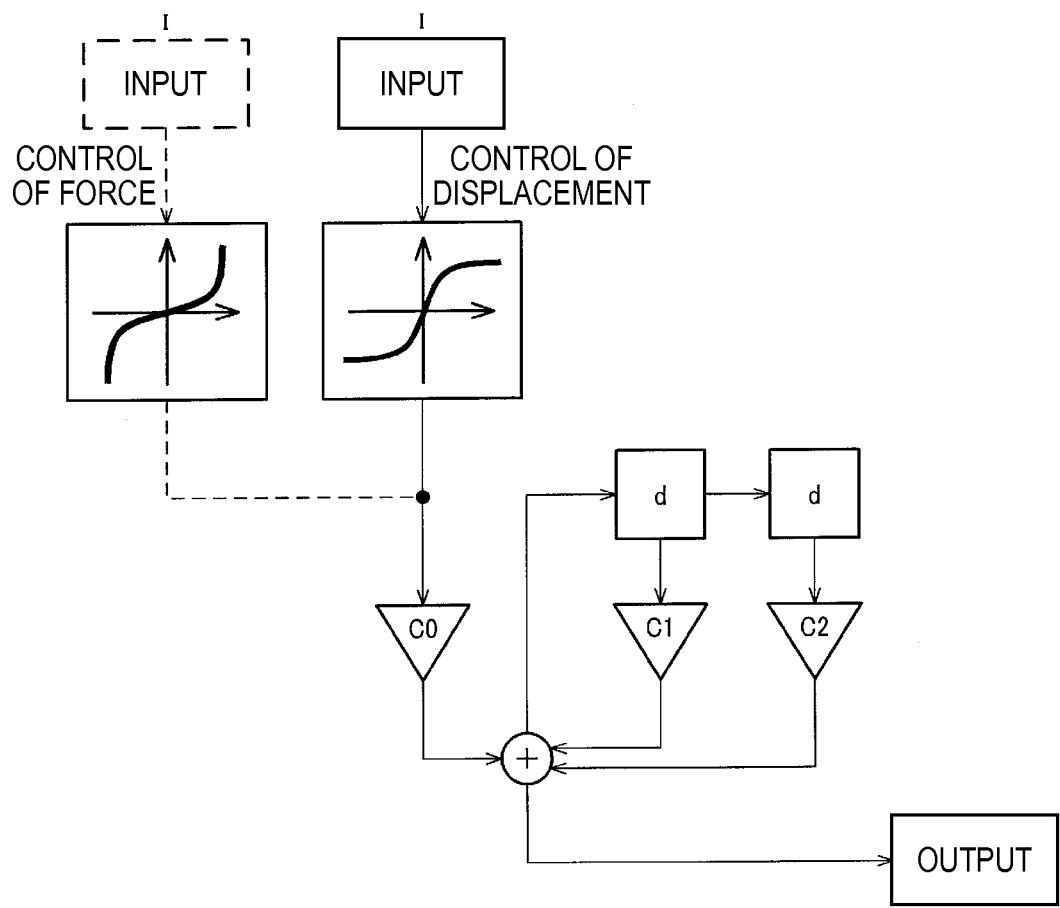
FIG. 20 shows a digital filter of the second embodiment.

Here, the digital filter in the second embodiment is as shown in FIG. 20. In the digital filter shown in FIG. 20, as expressed by equation (5), a value (F) formed by performing filter processing on the input value to the digital filter in FIG. 9 using filter processing function H as external force (input value) after nonlinear conversion processing. In equation (5), the function H according to the purpose such as the case of controlling the displacement or the case of controlling the force is used.

$$F = H(I) \quad (5)$$

According to the processing using the digital filter shown in FIG. 20, realization as hardware is easy and a determination of stability is also easy like the first embodiment.

3.2 Detailed Processing

Figure 21:
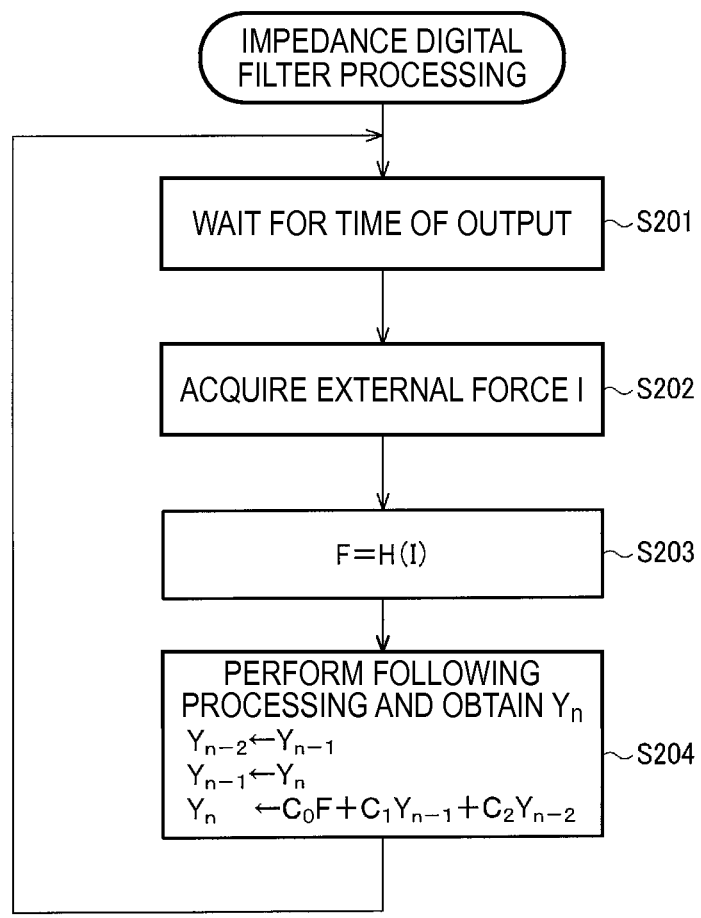
FIG. 21 is a flowchart for explanation of impedance digital filter processing of the second embodiment.

Next, a flow of the digital filter processing performed by the force control unit in the embodiment will be explained using a flowchart in FIG. 21.

First, an output time is waited (S201) and, at the output time, external force (external force value) I after position correction is acquired from the input correction unit (S202).

Then, equation (5) is calculated based on the external force (external force value) I, and the external force F after conversion processing is obtained (S203). Further, with the obtained F as an input value, an output value $Y_n$ is obtained according to equation (3) (S204).

Note that, in the embodiment, for example, a sigmoid function is used as the filter processing function like in the first embodiment, but not limited to that.

The above described robot controller of the embodiment includes the force control unit 20 that outputs the correction value of the target track of the robot based on the detected sensor value acquired from the force sensor 10, the target value output unit 60 that performs correction processing on the target track based on the correction value and obtains the target value, and outputs the obtained target value, and the robot control unit 80 that performs feedback control of the robot based on the target value. Further, the force control unit 20 includes the nonlinear convertor 29 that obtains the detected sensor value after conversion processing by performing nonlinear conversion processing on the detected sensor value acquired from the force sensor 10, and the impedance processor 21 that obtains the solution of the differential equation in force control as the correction value based on the detected sensor value after conversion processing acquired from the nonlinear convertor 29.

Thereby, by performing filter processing on the input value of the linear impedance processing, nonlinear impedance control may be realized. Further, by using the combination of linear systems, the stability of the solution of the equation of motion can be verified.

The embodiments have been explained in detail as described above, however, a person skilled in the art could easily understand that many modifications may be made without substantively departing from the spirit and effect of the invention. Therefore, these modifications may be within the scope of the invention. For example, in the specification or the drawings, the terms described with broader or synonymous different terms at least once may be replaced by the different terms in any part of the specification or the drawings. Further, the configurations and the operations of the robot controller and the robot system are not limited to those explained in the embodiment, and various modifications may be implemented.

The entire disclosure of Japanese Patent Application No. 2012-006775 filed Jan. 17, 2012 is hereby expressly incorporated by reference herein.

What is claimed is:

1. A robot controller comprising:
   a force control unit including an impedance processor and a nonlinear convertor, the force control unit receiving a detected sensor value from a force sensor and outputting a correction value of a target track of a robot based on the detected sensor value;
   a target value calculator determining a target value by performing correction processing on the target track based on the correction value; and
   a robot operator controlling the robot based on the target value and feedback signals from the robot, wherein the robot operator outputs control signals to the robot,
   wherein the impedance processor includes a digital filter that performs digital filter processing on the detected sensor value, and
   wherein the nonlinear convertor obtains the correction value by performing nonlinear conversion processing on an output of the digital filter and outputs the correction value to the target value calculator.

2. The robot controller according to claim 1, wherein when a virtual displacement with respect to the robot corresponding to the correction value is a first displacement, an amount of displacement change with respect to an external force is a first amount of displacement change,
   when the virtual displacement with respect to the robot corresponding to the correction value is a second displacement different from the first displacement, the amount of displacement change with respect to the external force is a second amount of displacement change, and
   the force control unit performs the nonlinear conversion processing such that the first amount of displacement change is larger than the second amount of displacement change when the virtual displacement is the first displacement which is larger than the second displacement.

3. The robot controller according to claim 1, wherein when a virtual displacement with respect to the robot corresponding to the correction value is a first displacement, an amount of displacement change with respect to an external force is a first amount of displacement change, and
   when the virtual displacement with respect to the robot corresponding to the correction value is a second displacement different from the first displacement, an amount of displacement change with respect to the external force is a second amount of displacement change, and
   the force control unit performs the nonlinear conversion processing such that the first amount of displacement change is smaller than the second amount of displacement change when the virtual displacement is the first displacement which is larger than the second displacement.

4. The robot controller according to claim 1, wherein the force control unit performs a first force control when a direction of a virtual displacement with respect to the robot corresponding to the correction value is a first direction, and performs a second force control different from the first force control when the direction of the virtual displacement is a second direction opposite to the first direction.

5. The robot controller according to claim 1, wherein the nonlinear convertor performs the nonlinear conversion processing using a sigmoid function on the correction value before the conversion processing acquired from the impedance processor or the detected sensor value acquired from the force sensor.

6. The robot controller according to claim 1, wherein the force control unit determines a stability of an operation of the digital filter of obtaining the correction value, and obtains a solution of a differential equation in compliance control as the correction value if a determination that the operation of the digital filter part is stable is made.

7. The robot controller according to claim 6, wherein the force control unit determines that the operation is stable when a pole of the digital filter has a value within a predetermined range.

8. The robot controller according to claim 1, wherein the robot operator controls the robot based on a feedback control in which an angle of a joint of the robot is controlled.

9. The robot controller according to claim 1, wherein the detected sensor value is an output value of the force sensor, a value obtained by correction of the output value of the force sensor, a value obtained by band limitation processing on the output value of the force sensor, or a value obtained by band limitation processing on a value obtained by correction of the output value of the force sensor.

10. A robot system comprising:
the robot controller according to claim 1; and
a robot that moves the respective parts based on the target value acquired from the target value output unit.

11. A robot controller comprising:
a force control unit including a nonlinear convertor and an impedance processor, the force control unit receiving a detected sensor value from a force sensor and outputting a correction value of a target track of a robot based on the detected sensor value;
a target value calculator determining a target value by performing correction processing on the target track based on the correction value; and
a robot operator controlling the robot based on the target value and feedback signals from the robot, wherein the robot operator outputs control signals to the robot,
wherein the nonlinear convertor performs nonlinear conversion processing on the detected sensor value acquired from the force sensor and outputs the detected sensor value after the nonlinear conversion processing, and
wherein the impedance processor includes a digital filter that obtains the correction value based on the detected sensor value after the nonlinear conversion processing by the nonlinear convertor, and outputs the obtained correction value to the target value calculator.

12. The robot controller according to claim 11, wherein
when a virtual displacement with respect to the robot corresponding to the correction value is a first displacement, an amount of displacement change with respect to an external force is a first amount of displacement change,
when the virtual displacement with respect to the robot corresponding to the correction value is a second displacement different from the first displacement, the amount of displacement change with respect to the external force is a second amount of displacement change, and
the force control unit performs the nonlinear conversion processing such that the first amount of displacement change is larger than the second amount of displacement change when the virtual displacement is the first displacement which is larger than the second displacement.

13. The robot controller according to claim 11, wherein
when a virtual displacement with respect to the robot corresponding to the correction value is a first displacement, an amount of displacement change with respect to an external force is a first amount of displacement change, and
when the virtual displacement with respect to the robot corresponding to the correction value is a second displacement different from the first displacement, an amount of displacement change with respect to the external force is a second amount of displacement change, and
the force control unit performs the nonlinear conversion processing such that the first amount of displacement change is smaller than the second amount of displacement change when the virtual displacement is the first displacement which is larger than the second displacement.

14. The robot controller according to claim 11, wherein the force control unit performs first force control when a direction of the virtual displacement with respect to the robot corresponding to the correction value is a first direction, and performs second force control different from the first force control when the direction of the virtual displacement is a second direction opposite to the first direction.

15. The robot controller according to claim 11, wherein the nonlinear convertor performs the nonlinear conversion processing using a sigmoid function on the correction value before the conversion processing acquired from the impedance processor or the detected sensor value acquired from the force sensor.

16. The robot controller according to claim 11, wherein the force control unit determines a stability of an operation of the digital filter of obtaining the correction value, and obtains a solution of a differential equation in compliance control as the correction value if a determination that the operation of the digital filter part is stable is made.

17. A robot system comprising:
the robot controller according to claim 11; and
a robot that moves the respective parts based on the target value acquired from the target value output unit.

18. A robot control method comprising:
receiving a detected sensor value from a force sensor;
performing, by a digital filter, a digital filter processing on the detected sensor value;
determining a correction value before conversion processing used for correction processing of a target track of a robot based on the detected sensor value after the digital filter processing;
determining the correction value after the conversion processing by performing nonlinear conversion processing on the obtained correction value before the conversion processing;
performing the correction processing on the target track of the robot to obtain a target value based on the obtained correction value after the conversion processing; and
controlling the robot based on the obtained target value and feedback signals received from the robot.

19. A robot control method comprising:
receiving a detected sensor value from a force sensor;
performing nonlinear conversion processing on the detected sensor value acquired from the force sensor to obtain the detected sensor value after conversion processing used for correction processing of a target track of a robot;
determining, by a digital filter, a correction value based on the obtained detected sensor value after the conversion processing;
determining a target value by performing the correction processing on the target track of the robot based on the obtained correction value; and
controlling the robot based on the obtained target value and feedback signals received from the robot.

* * * * *